United States Patent
Ning et al.

(10) Patent No.: US 12,019,706 B2
(45) Date of Patent: Jun. 25, 2024

(54) DATA AUGMENTATION FOR OBJECT DETECTION VIA DIFFERENTIAL NEURAL RENDERING

(71) Applicant: JINGDONG TECHNOLOGY HOLDING CO., LTD., Beijing (CN)

(72) Inventors: Guanghan Ning, Sunnyvale, CA (US); Si Luo, Bothell, WA (US); Liefeng Bo, Sunnyvale, CA (US); Harry Huang, Mountain View, CA (US)

(73) Assignee: JINGDONG TECHNOLOGY HOLDING CO., LTD., Beijing (CN)

( * ) Notice: Subject to any disclaimer, the term of this patent is extended or adjusted under 35 U.S.C. 154(b) by 458 days.

(21) Appl. No.: 17/327,745

(22) Filed: May 23, 2021

(65) Prior Publication Data

US 2022/0383041 A1    Dec. 1, 2022

(51) Int. Cl.
| | |
|---|---|
| *G06F 18/214* | (2023.01) |
| *G06F 18/21* | (2023.01) |
| *G06T 7/50* | (2017.01) |
| *G06V 10/50* | (2022.01) |
| *G06V 10/75* | (2022.01) |

(52) U.S. Cl.
CPC .......... *G06F 18/214* (2023.01); *G06F 18/217* (2023.01); *G06T 7/50* (2017.01); *G06V 10/50* (2022.01); *G06V 10/751* (2022.01); *G06T 2207/20081* (2013.01); *G06T 2207/20084* (2013.01)

(58) Field of Classification Search
CPC ....... G06F 18/214; G06F 18/217; G06T 7/50; G06T 2207/20081
See application file for complete search history.

(56) References Cited

U.S. PATENT DOCUMENTS

| 2016/0065903 A1* | 3/2016 | Wang ....................... G06F 3/013 |
| | | 348/148 |
| 2017/0039756 A1* | 2/2017 | Moule ...................... G06T 7/593 |
| 2018/0075602 A1* | 3/2018 | Shen .......................... G06T 7/62 |

(Continued)

OTHER PUBLICATIONS

Connor Shorten, and Taghi Khoshgoftaar, A survey on image data augmentation for deep learning, Journal of Big Data, 2019, 6(1), 60.

(Continued)

*Primary Examiner* — Myron Wyche
(74) *Attorney, Agent, or Firm* — Scully, Scott, Murphy & Presser, P.C.

(57) ABSTRACT

A system and a method for object detection using augmented training dataset. The system includes a computing device, which is configured to: provide a two-dimensional (2D) image, extract feature vectors and estimate depths of 2D image pixels, generate a point cloud using the feature vectors and the depths, and project the point cloud using a new camera pose to obtain a projected image. The 2D image has a bounding box enclosing an object and labeled with the object. Each pixel within the bounding box is named bounding box pixel, each point in the point cloud corresponding to the bounding box pixel is named bounding box point, each image pixel in the projected image corresponding to the bounding box point is named projected bounding box pixel, and a projected bounding box is defined using the projected bounding box pixels and labeled with the object.

20 Claims, 13 Drawing Sheets

(56) References Cited

U.S. PATENT DOCUMENTS

| | | | | |
|---|---|---|---|---|
| 2019/0362186 A1* | 11/2019 | Irshad | ................. | G08G 5/0026 |
| 2020/0250453 A1* | 8/2020 | Gupta | ................... | G06F 3/0482 |
| 2021/0134048 A1* | 5/2021 | Weng | ...................... | G06T 17/00 |
| 2021/0158139 A1* | 5/2021 | Mai | ....................... | G06N 3/045 |
| 2021/0166367 A1* | 6/2021 | Han | ...................... | B64U 10/13 |
| 2021/0264659 A1* | 8/2021 | Kim | .................... | G06V 10/774 |

OTHER PUBLICATIONS

A. Tewari, O. Fried, et al., State of the art on neural rendering, arXiv, 2020, arXiv:2004.03805.

Ming-Yu Liu, Xun Huang, Jiahui Yu, Ting-Chun Wang, Arun Mallya, Generative adversarial networks for Image and video synthesis: algorithms and applications, arXiv, 2020, arXiv:2008.02793.

* cited by examiner (1)
R = tensor([[ 0.9888, 0.0075, -0.1492],
[ 0.0075, 0.9950, 0.0995],
[ 0.1492, -0.0995, 0.9838]])
T = tensor([0.0000, 0.0000, 0.3000])
Projection =
tensor([[[ 0.9888, 0.0075, -0.1492, 0.0000],
[ 0.0075, 0.9950, 0.0995, 0.0000],
[ 0.1492, -0.0995, 0.9838, 0.3000],
[ 0.0000, 0.0000, 0.0000, 1.0000]]])
(2)
R = tensor([[ 0.9888, -0.0075, -0.1492],
[-0.0075, 0.9950, -0.0995],
[ 0.1492, 0.0995, 0.9838]])
T = tensor([0.0000, 0.0000, 0.3000])
Projection =
tensor([[[ 0.9888, -0.0075, -0.1492, 0.0000],
[-0.0075, 0.9950, -0.0995, 0.0000],
[ 0.1492, 0.0995, 0.9838, 0.3000],
[ 0.0000, 0.0000, 0.0000, 1.0000]]])

(3)
R = tensor([[ 0.9888, -0.0075, 0.1492],
[-0.0075, 0.9950, 0.0995],
[-0.1492, -0.0995, 0.9838]])
T = tensor([0.0000, 0.0000, 0.3000])
Projection = tensor([[[ 0.9888, -0.0075, 0.1492, 0.0000],
[-0.0075, 0.9950, 0.0995, 0.0000],
[-0.1492, -0.0995, 0.9838, 0.3000],
[ 0.0000, 0.0000, 0.0000, 1.0000]]])
(4)
R = tensor([[ 0.9888, 0.0075, 0.1492],
[ 0.0075, 0.9950, -0.0995],
[-0.1492, 0.0995, 0.9838]])
T = tensor([0.0000, 0.0000, 0.3000])
Projection = tensor([[[ 0.9888, 0.0075, 0.1492, 0.0000],
[ 0.0075, 0.9950, -0.0995, 0.0000],
[-0.1492, 0.0995, 0.9838, 0.3000],
[ 0.0000, 0.0000, 0.0000, 1.0000]]])

| Render-Res | AP | AP$_{50}$ | AP$_{75}$ | AP$_S$ | AP$_M$ | AP$_L$ |
|---|---|---|---|---|---|---|
| N.A. | 69.4 | 95.4 | 78.4 | 56.5 | 59.1 | 72.8 |
| 256-native | 78.4 | 97.3 | 90.8 | 54.2 | 59.8 | 82.1 |
| 512-pixelSS | 79.0 | 97.5 | 91.4 | 63.2 | 65.5 | 82.5 |
| 512-pointSS | 79.1 | 97.6 | 92.0 | 64.5 | 70.4 | 82.4 |
| 512-native | 79.6 | 97.7 | 91.4 | 61.4 | 67.3 | 83.2 |

FIG. 9A

| | AP | | AP$_{50}$ | | AP$_{75}$ | |
|---|---|---|---|---|---|---|
| Train/Val | N.A. | +Aug | N.A. | +Aug | N.A. | +Aug |
| 5/5 | 69.4 | 79.6 | 95.4 | 97.7 | 78.4 | 91.4 |
| 3/7 | 56.7 | 71.0 | 87.7 | 91.9 | 65.3 | 83.1 |
| 1/9 | 11.9 | 47.2 | 27.5 | 74.8 | 8.5 | 51.4 |

FIG. 9B

| | AP | | AP$_{50}$ | | AP$_{75}$ | |
|---|---|---|---|---|---|---|
| Backbone | N.A. | +Aug | N.A. | +Aug | N.A. | +Aug |
| ResNet-50 | 53.2 | 77.4 | 77.0 | 96.4 | 60.3 | 90.7 |
| ResNeSt-50 | 69.4 | 79.6 | 95.4 | 97.7 | 78.4 | 91.4 |

FIG. 9C

| | AP | | AP$_{50}$ | | AP$_{75}$ | |
|---|---|---|---|---|---|---|
| Framework | N.A. | +Aug | N.A. | +Aug | N.A. | +Aug |
| One-Stage | 69.4 | 79.6 | 95.4 | 97.7 | 78.4 | 91.4 |
| Two-stage | 68.1 | 78.7 | 96.4 | 97.5 | 81.5 | 89.3 |

FIG. 9D

| Dataset | AP | | AP$_{50}$ | | AP$_{75}$ | | AP$_S$ | | AP$_M$ | | AP$_L$ | | AUC | |
|---|---|---|---|---|---|---|---|---|---|---|---|---|---|---|
| | N.A. | +Aug | N.A. | +Aug | N.A. | +Aug | N.A. | +Aug | N.A. | +Aug | N.A. | +Aug | N.A. | +Aug |
| Indoor | 69.4 | 79.6 | 95.4 | 97.7 | 78.4 | 91.4 | 56.5 | 61.4 | 59.1 | 67.3 | 72.8 | 83.2 | - | - |
| ICR-Weapon | - | - | - | - | - | - | - | - | - | - | - | - | 0.68 | 0.75 |
| ICR-Logo | - | - | - | - | - | - | - | - | - | - | - | - | 0.73 | 0.96 |
| ICR-Flag | - | - | - | - | - | - | - | - | - | - | - | - | 0.72 | 0.97 |
| COCO | 33.4 | 33.1 | 52.8 | 52.6 | 34.8 | 34.5 | 12.8 | 12.6 | 38 | 37.6 | 51.6 | 51.8 | - | - |

FIG. 9E

DATA AUGMENTATION FOR OBJECT DETECTION VIA DIFFERENTIAL NEURAL RENDERING

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD OF THE DISCLOSURE

The present disclosure relates generally to object detection training using augmented data, and more specifically related to generating augmented data using differential neural rendering.

BACKGROUND OF THE DISCLOSURE

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Object detection neural networks or object detectors require training using annotated data. It is challenging to train the object detectors when the annotated data is scarce, because the detectors need to handle objects that may occur in any place in an image, and thus requiring a significant amount of data. Further, traditional online data augmentation methods include random crop and image mix-up. The online data augmentation methods provide additional data diversity to avoid overfitting, but do not provide unseen semantics and novel locations. Moreover, as an offline data augmentation approach, a training image can be synthesized. However, simply sticking the object foreground onto a novel background (alpha compositing) is not natural. It introduces artifacts that may impair or undermine the detector model. Besides, it still requires additional labeling, i.e, annotating the object foreground at pixel-level.

Therefore, an unaddressed need exists in the art to address the aforementioned deficiencies and inadequacies.

SUMMARY OF THE DISCLOSURE

In certain aspects, the present disclosure relates to a system. In certain embodiments, the system includes a computing device, the computing device has a processer and a storage device storing computer executable code. The computer executable code, when executed at the processor, is configured to:
provide a two-dimensional (2D) image and a projection camera pose, wherein the 2D image comprises a bounding box, the bounding box encloses an object, and the bounding box is annotated according to the object;
extract feature vectors of pixels in the 2D image, each pixel having a corresponding feature vector;
estimate depths of the pixels from the 2D image;
generate a point cloud using the feature vectors and the depths of the pixels; and
project the point cloud to obtain a projected image using the projection camera pose,
where each of the pixels within the bounding box has a bounding box label and is named bounding box pixel, each point in the point cloud corresponding to the bounding box pixel has the bounding box label and is named bounding box point, each image pixel in the projected image corresponding to the bounding box point has the bounding box label and is named projected bounding box pixel, and a projected bounding box is defined using the projected bounding box pixels.

In certain embodiments, the computer executable code is configured to extract the feature points using an encoder with Inception-ResNet blocks.

In certain embodiments, the computer executable code is configured to estimate the depths using an hourglass network.

In certain embodiments, when the projected camera pose is an original pose of a camera taking the 2D image, the computer executable code is configured to project the point cloud using:

$$\begin{cases} X_c = d \times (u - c_x)/f_x \\ Y_c = d \times (v - c_y)/f_y \\ Z_c = d \end{cases} \quad (1)$$

wherein (u, v) is coordinate of a target point in the point cloud, d is depth of the target point in the point cloud, $c_x$ and $c_y$ are bias of a center of the camera, $f_x$ and $f_y$ are focal lengths on x and y axes of the camera, and ($X_c$, $Y_c$, $Z_c$) are coordinates of the target point in the camera coordinate system. In certain embodiments, the computer executable code is configured to compare the projected image with the 2D image to learn parameters for extracting the feature keypoints, estimating the depths, generating the point cloud, and projecting the point cloud.

In certain embodiments, when the projected camera pose is a new pose having a rotation R and a translation T relative to the original camera pose, the computer executable code is configured to project the point cloud using:

$$P_c = R \cdot (P_w - T), \text{ and} \quad (2)$$

$$\begin{cases} u' = f_x \times X'_c/Z'_c + c_x \\ v' = f_y \times Y'_c/Z'_c + c_x \end{cases}, \quad (3)$$

wherein $P_w$ is equivalent to the equation (1), $P_c$ is coordinates of the target point in a novel camera coordinate system corresponding to the new pose and $P_c$ is represented by ($Z'_c$, $Y'_c$, $Z'_c$) and (u', v') are coordinates of a pixel in the projected image corresponding to the target point.

In certain embodiments, the projected bounding box is defined by:

$$\begin{cases} x_{min} = \min(\{u \mid (u', v') \in P'_i\}) \\ x_{max} = \max(\{u \mid (u', v') \in P'_i\}) \\ y_{min} = \min(\{v \mid (u', v') \in P'_i\}) \\ y_{max} = \max(\{v \mid (u', v') \in P'_i\}) \end{cases}, \quad (4)$$

wherein $P'_i=\{(u'_i, v'_i)\}$ are coordinates of pixels in the projected bounding box.

In certain embodiments, the computer executable code is further configured to:

combine the 2D image and the bounding box, and the projected image and projected bounding box, to form a training dataset;

use the training dataset to train a neural network for object detection;

use the neural network to detect objects in retrieved images from an ecommerce platform; and send a warning message for one of the retrieved images when a detected object from the one of the retrieved images belongs to a predefined object type.

In certain embodiments, the projected camera pose includes four different poses different from original camera pose for taking the 2D image.

In certain embodiments, a number of the projected pose is four, and the four projected poses are substantially evenly distributed in three-dimensional space relative to the original camera pose.

In certain aspects, the present disclosure relates to a method. In certain embodiments, the method includes the steps of:

providing, by a computing device, a two-dimensional (2D) image and a projection camera pose, wherein the 2D image comprises a bounding box, the bounding box encloses an object, and the bounding box is annotated according to the object;

extracting, by the computing device, feature vectors of pixels in the 2D image, each pixel having a corresponding feature vector;

estimating, by the computing device, depths of the pixels from the 2D image;

generating, by the computing device, a point cloud using the feature vectors and the depths of the pixels; and projecting, by the computing device, the point cloud to obtain a projected image using the projection camera pose, where each of the pixels within the bounding box has a bounding box label and is named bounding box pixel, each point in the point cloud corresponding to the bounding box pixel has the bounding box label and is named bounding box point, each pixel in the projected image corresponding to the bounding box point has the bounding box label and is named projected bounding box pixel, and a projected bounding box is defined using the projected bounding box pixels.

In certain embodiments, the step of extracting the feature vectors is performed using an encoder with Inception-ResNet blocks.

In certain embodiments, the step of estimating the depths is performed using an hourglass network.

In certain embodiments, when the projected camera pose is an original pose of a camera taking the 2D image, the step of projecting the point cloud is performed using:

$$\begin{cases} X_c = d \times (u - c_x)/f_x \\ Y_c = d \times (v - c_y)/f_y \\ Z_c = d \end{cases} \quad (1)$$

wherein (u, v) is coordinate of a target point in the point cloud, d is depth of the point in the point cloud, $c_x$ and $c_y$ are bias of a center of the camera, $f_x$ and $f_y$ are focal lengths on x and y axes of the camera, and ($X_c$, $Y_c$, $Z_c$) are coordinates of the target point in the camera coordinate system. In certain embodiments, the method further includes comparing the projected image with the 2D image to learn parameters for extracting the feature vectors, estimating the depths, generating the point cloud, and projecting the point cloud.

In certain embodiments, when the projected camera pose is a new pose having a rotation R and a translation T relative to the original camera pose, the step of projecting the point cloud is performed using:

$$P_c = R \cdot (P_w - T), \text{ and} \quad (2)$$

$$\begin{cases} u' = f_x \times X'_c/Z'_c + c_x \\ v' = f_y \times Y'_c/Z'_c + c_x \end{cases}, \quad (3)$$

where $P_w$ is equivalent to the equation (1), $P_c$ is coordinates of the target point in a novel camera coordinate system corresponding to the new pose and $P_c$ is represented by ($X'_c$, $Y'_c$, $Z'_c$), and (u', v') are coordinates of a pixel in the projected image corresponding to the target point.

In certain embodiments, the projected bounding box is defined by:

$$\begin{cases} x_{min} = \min(\{u \mid (u', v') \in P'_i\}) \\ x_{max} = \max(\{u \mid (u', v') \in P'_i\}) \\ y_{min} = \min(\{v \mid (u', v') \in P'_i\}) \\ y_{max} = \max(\{v \mid (u', v') \in P'_i\}) \end{cases}, \quad (4)$$

wherein $P_i=\{(u'_i, v'_i)\}$ are coordinates of pixels in the projected bounding box.

In certain embodiments, the method further includes:

combining the 2D image and the bounding box, and the projected image and projected bounding box, to form a training dataset;

using the training dataset to train a neural network for object detection;

using the neural network to detect objects in retrieved images from an ecommerce platform; and sending a warning message for one of the retrieved images when a detected object from the one of the retrieved images belongs to a predefined object type.

In certain embodiments, the projected camera pose comprises four different poses different from original camera pose for taking the 2D image.

In certain aspects, the present disclosure relates to a non-transitory computer readable medium storing computer executable code. The computer executable code, when executed at a processor of a computing device, is configured to perform the method described above.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

FIG. 9A compares performance of a DANR using high render resolution and low render resolution according to certain embodiments of the present disclosure.

FIG. 9B compares performance of a DANR using different training: validation data splitting ratios according to certain embodiments of the present disclosure.

FIG. 9C compares performance of a DANR using different backbones according to certain embodiments of the present disclosure.

FIG. 9D compares performance of a DANR using one stage and two-stage detection frameworks according to certain embodiments of the present disclosure.

FIG. 9E shows performance of a DANR using different types of datasets according to certain embodiments of the present disclosure.

DETAILED DESCRIPTION

Figure 1:
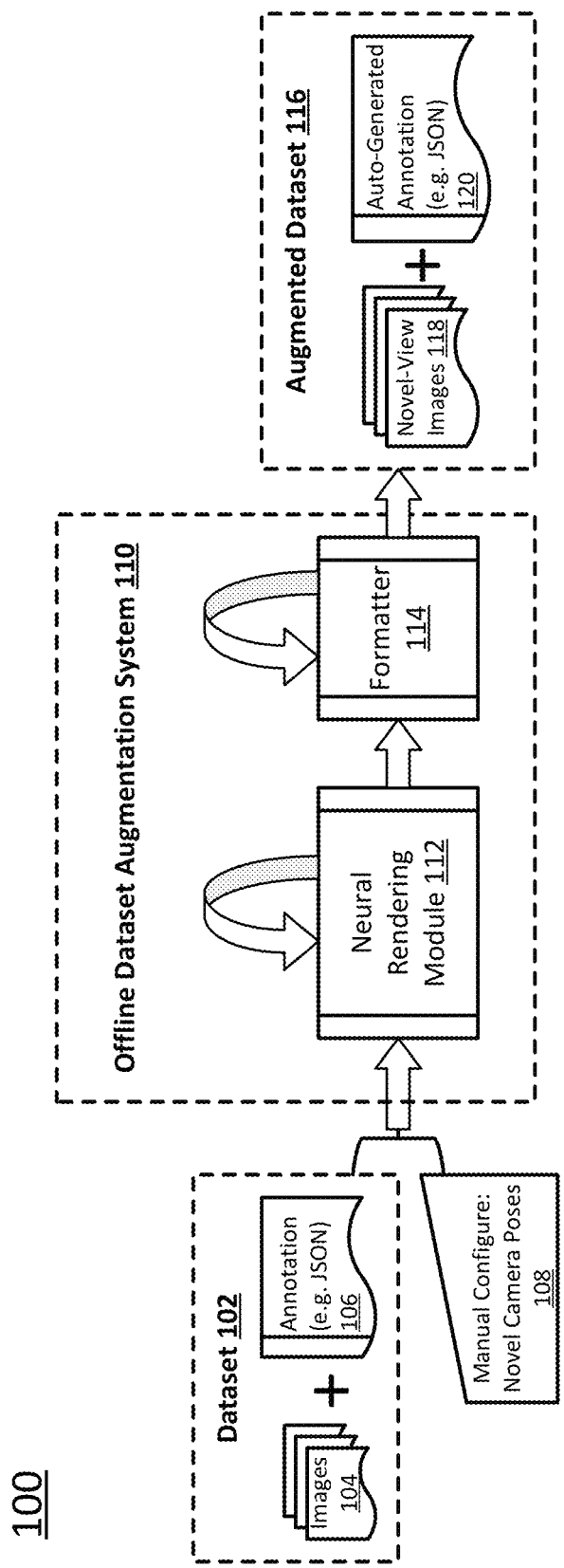
FIG. 1 schematically depicts a data augmentation system based on neural rendering (DANR) according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise, and "plurality" means two or more. As used herein, the terms "comprising", "including", "carrying", "having", "containing", "involving", and the like are to be understood to be open-ended, i.e., to mean including but not limited to. Moreover, titles or subtitles may be used in the specification for the convenience of a reader, which shall have no influence on the scope of the present disclosure.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

FIG. 1 is an overview of a data augmentation system 100 based on neural rendering (DANR) according to certain embodiments of the present disclosure. The purpose of the system 100 is to augment an object detection dataset with novel view images, and use the augmented dataset to improve performance of object detectors. The number of novel view images or augmented images is controllable, and degree of camera pose variations for the augmented images are also controllable. As shown in FIG. 1, input of the system 100 is a labeled dataset 102 for object detection training and configurations of novel camera poses 108. The labeled dataset 102 has a number of training images 104, and each training image 104 has its corresponding annotation 106. The annotation 106 for each training image 104 may include a bounding box in the image that encloses an object, and label of the object. For example, the image may show a handgun, and the annotation of the image may include a bounding box in the image that encloses the handgun, as well as a label "handgun" or "weapon." The novel camera poses 108 may be predefined, which may include one or multiple poses that have different variations relative to the camera poses of the images 104. When the dataset 102 and the novel camera poses 108 are inputted to an offline dataset augmentation system 110, a neural rendering module 112 renders the images 104 at the different novel camera poses 108 to obtain new images. The bounding boxes of the images 104 are also rendered with the images 104 to obtain rendered bounding boxes. The rendered bounding boxes inherit their labels. The new images having the rendered bounding boxes and the labels are formatted by a formatter 114 to obtain an augmented dataset 116. The augmented dataset 116 has the novel images 118 and the automatically generated annotations 120. The format of the augmented dataset 116 is the same as the format of the original training dataset 102. In certain embodiments, the system combines the dataset 102 and the augmented dataset 116 to obtain a new training dataset. The new training dataset thus includes more training data, and can be used to train object detection effectively.

Figure 2:
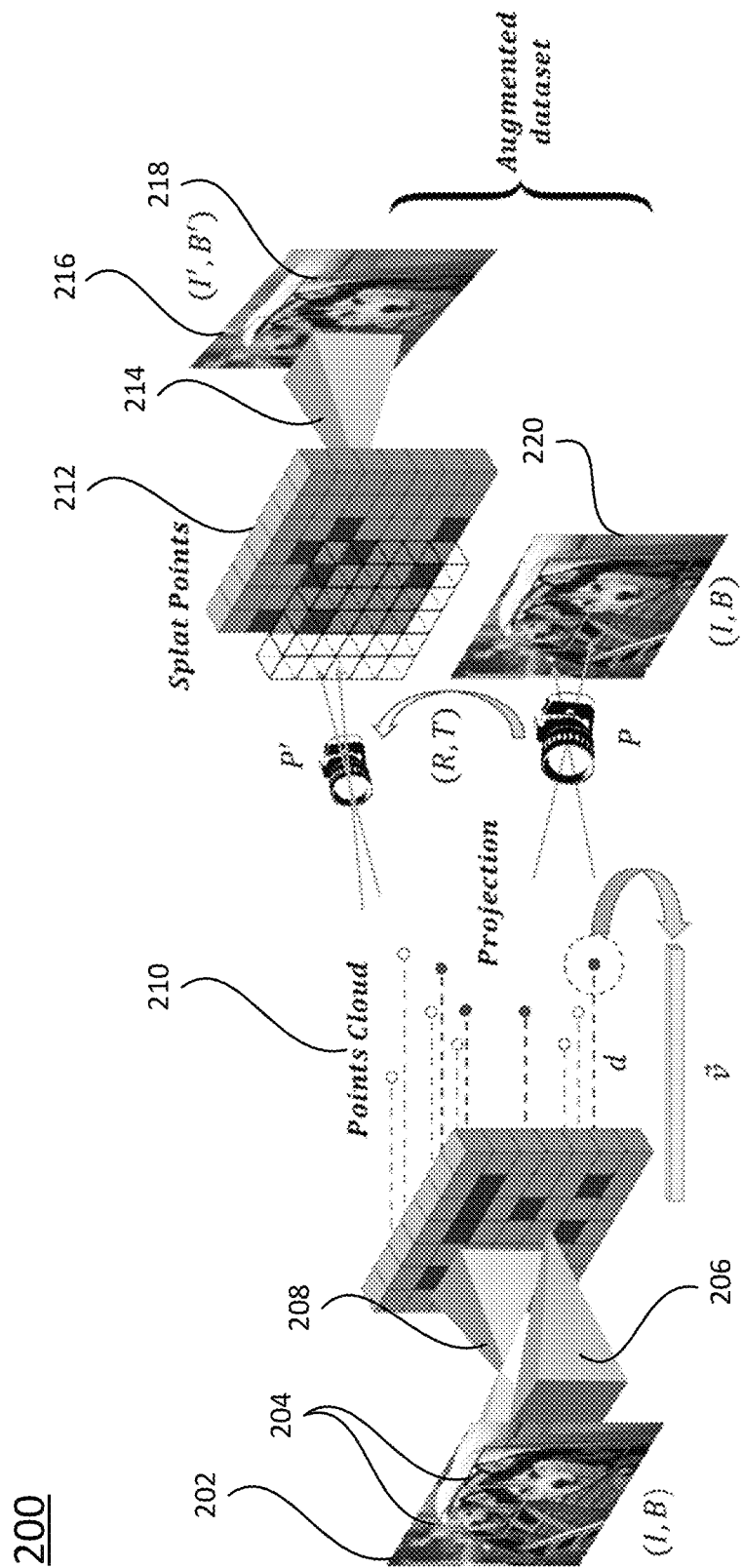
FIG. 2 schematically depicts operation of a novel view synthesis model according to certain embodiments of the present disclosure.

FIG. 2 schematically depicts operation of a novel view synthesis model 200 according to certain embodiments of the present disclosure. In certain embodiments, the novel view synthesis model corresponds to the neural rendering module 112 in FIG. 1. As show in FIG. 2, the model takes as input a red-green-blue (RGB) image 202 (I) and annotations for bounding boxes 204 (B). In certain embodiments, the bounding boxes 204 are represented by a series of two-dimensional (2D) image keypoints (Bi). The RGB image 202 is simultaneously fed to two branches: (1) an hourglass network 206 for depth estimation (Newell, et al., Stacked hourglass networks for human pose estimation, in ECCV, 2916, which is incorporated herein by reference in its entirety), and (2) an encoder 208 with Inception-ResNet blocks to extract visual features (Ning et al., Knowledge-guided deep fractal neural network for human pose estimation, which is incorporated herein by reference in its entirety). The extracted visual features are pixel-aligned, i.e., each pixel on the feature maps carries a latent-space vector that corresponds to this particular spatial location. The depth estimation branch assigns depth value to each pixel, elevating latent space vectors to a point cloud 210. Each point in the point cloud resides in a three-dimensional (3D) space with the 2.5D coordinate representation: (u, v, d) (Iqbal et al., Hand pose estimation via latent 2.5d heatmap regression, ECCV, 2018, which is incorporated herein by reference in its entirety), where u and v are 2D coordinates of the points in the point cloud, and d is the depths of the points. Each point may unfold its hidden N-dimensional latent-space vector after being projected to a target camera view. These feature vectors can be reprojected to an arbitrary camera coordinate system, based on a given projection matrix (translation vector T and rotation vector R relative to the corresponding camera of the original image). The camera pose of the original image is defined as P. Given a target camera pose P', the disclosure splats the feature points following Wiles's method (Wiles, et al., Synsin: End-to-end view synthesis from a single image, CVPR, 2020, which is incorporated herein by reference in its entirety) to make the rendering process differentiable. After splatted on a palette of size K×K, these points result in an N-dimensional feature map 212 of a predefined resolution. The feature maps 212 are then fed to a decoder network 214 with inception-residual blocks and upsampling layers, rendering the final novel view image 216 (I'). In order to recover the bounding box annotations for the object detection datasets, the disclosure marks the keypoints of the bounding boxes beforehand. When they are projected to 3D space with depth information and re-projected back to 2D in the novel camera view, the marks consistently follow corresponding pixel-aligned points. Accordingly, a novel bounding box 218 (B') is defined and labeled automatically. The whole system is end-to-end differentiable. When the original camera pose P is used for splatting and decoding, a novel image 220 with annotations is obtained. The novel image 220 and its bounding box annotations can be compared with the original image 202 and its bounding box annotations, so as to train the model. Kindly note the annotations of the bounding boxes include both the locations of the bounding boxes and their labels. The locations of a bounding box may be defined by its up-left corner and lower-right corner, or by the up-left corner and the bounding box's height and width, or by a center point, the height, and the width, or any other suitable format. The labels of the bounding box may be the name or the type of the object in the bounding box, such as a dog.

Figure 3:
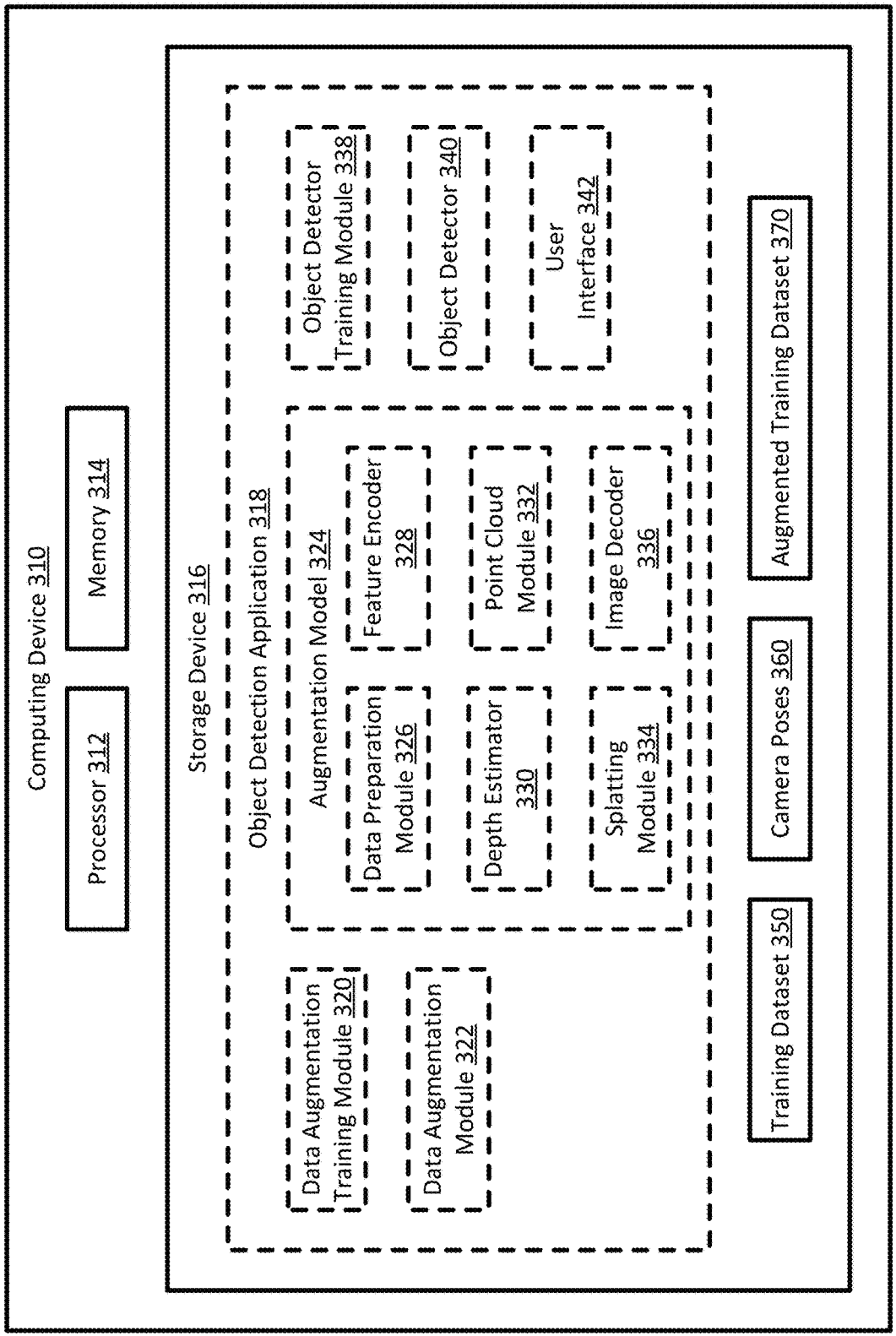
FIG. 3 schematically depicts an implementation of a DANR according to certain embodiments of the present disclosure.

FIG. 3 schematically depicts an implementation of a data augmentation system 300 based on neural rendering (DANR) according to certain embodiments of the present disclosure. As shown in FIG. 3, the system 300 includes a computing device 310. The computing device 310 may be a server computing device, a cluster, a cloud computer, a general-purpose computer, or a specialized computer that provide training for object detection and perform object detection. In certain embodiments, the computing device 310 is a server of an e-commerce platform, which is configured to store training images for object detection, augment the number of the training images, train an object detection model using the augmented training images, and use the well-trained object detection model to detect objects in the e-commerce platform. In certain embodiments, the training images are updated regularly, and the object detection model can be re-trained regularly.

As shown in FIG. 3, the computing device 310 may include, without being limited to, a processor 312, a memory 314, and a storage device 316. In certain embodiments, the computing device 310 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices. The processor 312 may be a central processing unit (CPU) which is configured to control operation of the computing device 310. The processor 312 can execute an operating system (OS) or other applications of the computing device 310. In certain embodiments, the computing device 310 may have more than one CPU as the processor, such as two CPUs, four CPUs, eight CPUs, or any suitable number of CPUs. The memory 314 can be a volatile memory, such as the random-access memory (RAM), for storing the data and information during the operation of the computing device 310. In certain embodiments, the memory 314 may be a volatile memory array. In certain embodiments, the computing device 310 may run on more than one memory 314. The storage device 316 is a non-volatile data storage media for storing the OS (not shown) and other applications of the computing device 310. Examples of the storage device 316 may include non-volatile memory such as flash memory, memory cards, USB drives, hard drives, floppy disks, optical drives, solid-state drive (SSD) or any other types of data storage devices. In certain embodiments, the storage device 316 may be a local storage, a remote storage, or a cloud storage. In certain embodiments, the computing device 310 may have multiple storage devices 316, which may be identical storage devices or different types of storage devices, and the applications of the computing device 310 may be stored in one or more of the storage devices 316 of the computing device 310. In certain embodiments, the computing device 310 is a cloud computer, and the processor 312, the memory 314 and the storage device 316 are shared resources provided over the Internet on-demand.

As shown in FIG. 3, the storage device 316 includes an object detection application 318, a training dataset 350, camera poses 360, and augmented training dataset 370. The object detection application 318 includes a data augmentation training module 320, a data augmentation module 322, an augmentation model 324, an object detector training module 338, an object detector 340, and a user interface 342. The object detection application 318 is configured to train the augmentation model 324, use the well-trained augmentation model 324 to obtain augmented training dataset 370 from training dataset 350, use the augmented training data 370 to train the object detector 340, and use the well-trained object detector 340 to perform object detection on images. Specifically, the data augmentation training module 320 is configured to instruct the augmentation model 324 to train the model, so as to obtain well-trained augmentation model 324, and the data augmentation module 322 is configured to, upon receiving notice from the augmentation model 324 that the model is well-trained, instruct the well-trained augmentation model 324 to use the training dataset 350 to obtain augmented training dataset 370.

The augmentation model 324 is configured to, upon receiving the instruction from the data augmentation training module 320, perform training of the augmentation model to obtain the well-trained augmentation model, and send notice to the data augmentation module 322 that the augmentation model 324 is well-trained. The augmentation model 324 is further configured to, upon receiving the instruction from the data augmentation module 322, perform data augmentation to obtain augmented training dataset 370. In certain embodiments, the data augmentation training module 320 and the data augmentation module 322 may also be part of the augmentation model 324.

As shown in FIG. 3, the augmentation model 324 includes a data preparation module 326, a feature encoder 328, a depth estimator 330, a point cloud module 332, a splatting module 334, and an image decoder 336. The data preparation module 326 is configured to prepare data from the training dataset 350, and send the prepared dataset to the feature encoder 328 and the depth estimator 330. As described above, each dataset of the training dataset 350 includes an image and an annotation of the image. The image may be a RGB image. In certain embodiments, the image may be, without being limited to, an image having a 512×512 resolution. The annotation includes location of a bounding box in the image, the bounding box encloses an object, and the annotation includes a label of the object. The location of the bounding box may be in any appropriate forms. In certain embodiments, the bounding box is defined by labeling each pixel in the bounding box. In certain embodiments, the bounding box is defined by a center pixel, a width of the bounding box, and a length of the bounding box. In certain embodiments, the bounding box is defined by four corner points of the bounding box. The label of the bounding box may be a category of the object, or a name of the object. In certain embodiments, the object is a handgun, and the label may be "handgun" or "weapon." In certain embodiments, the datasets including the images and the annotations are stored in JAVASCRIPT OBJECT NOTATION (JSON) format. In certain embodiments, the datasets for training the augmentation model 324 and the datasets for augmentation may be different or may be the same. In certain embodiments, the training dataset may be updated regularly, and the augmentation model 324 may train the model after each update. In certain embodiments, the datasets for augmentation may be updated regularly at a predefined time interval, such as every day, every week, or every month, and the augmentation model 324 may generate updated augmented training dataset 370 after each update.

Figure 4A:
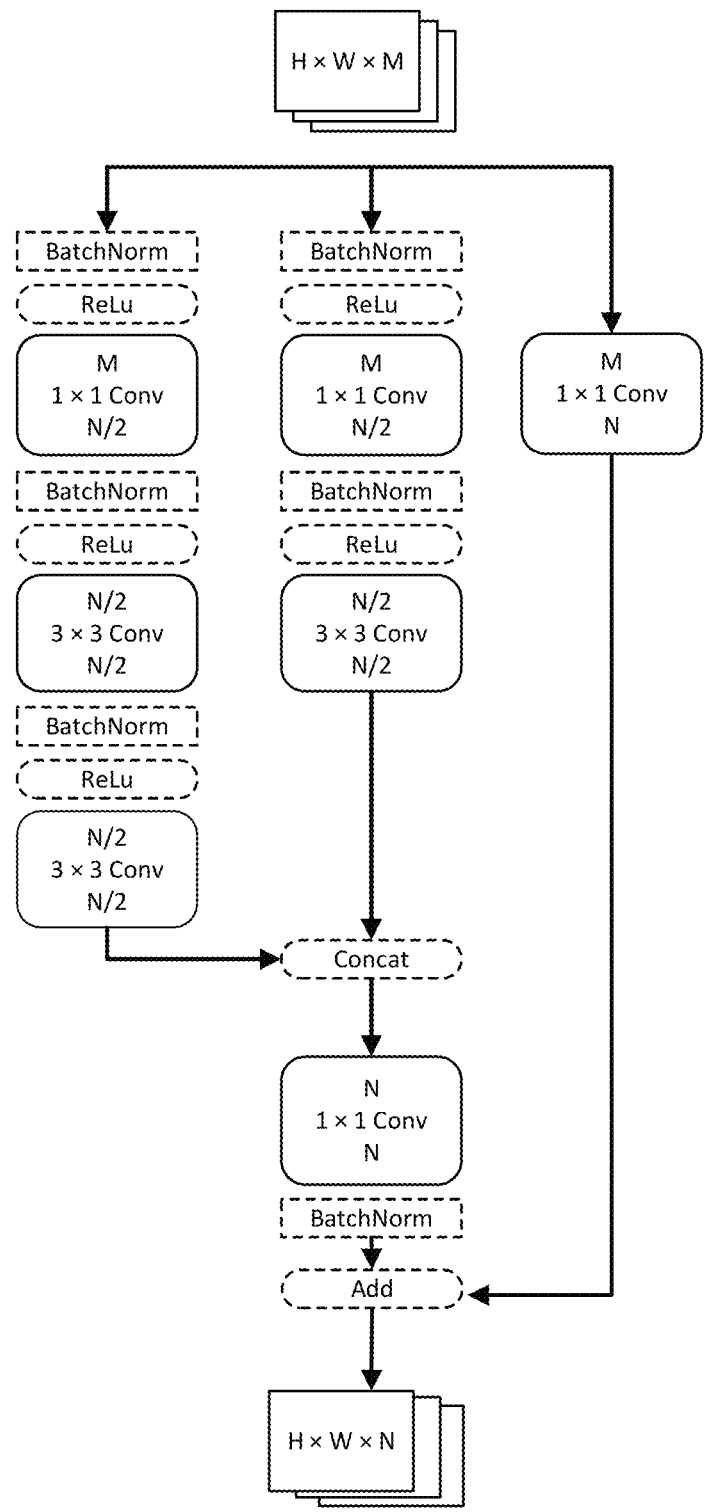
FIG. 4A schematically depicts an inception-residual block of a DANR that maintains the resolution of features according to certain embodiments of the present disclosure.
Figure 4B:
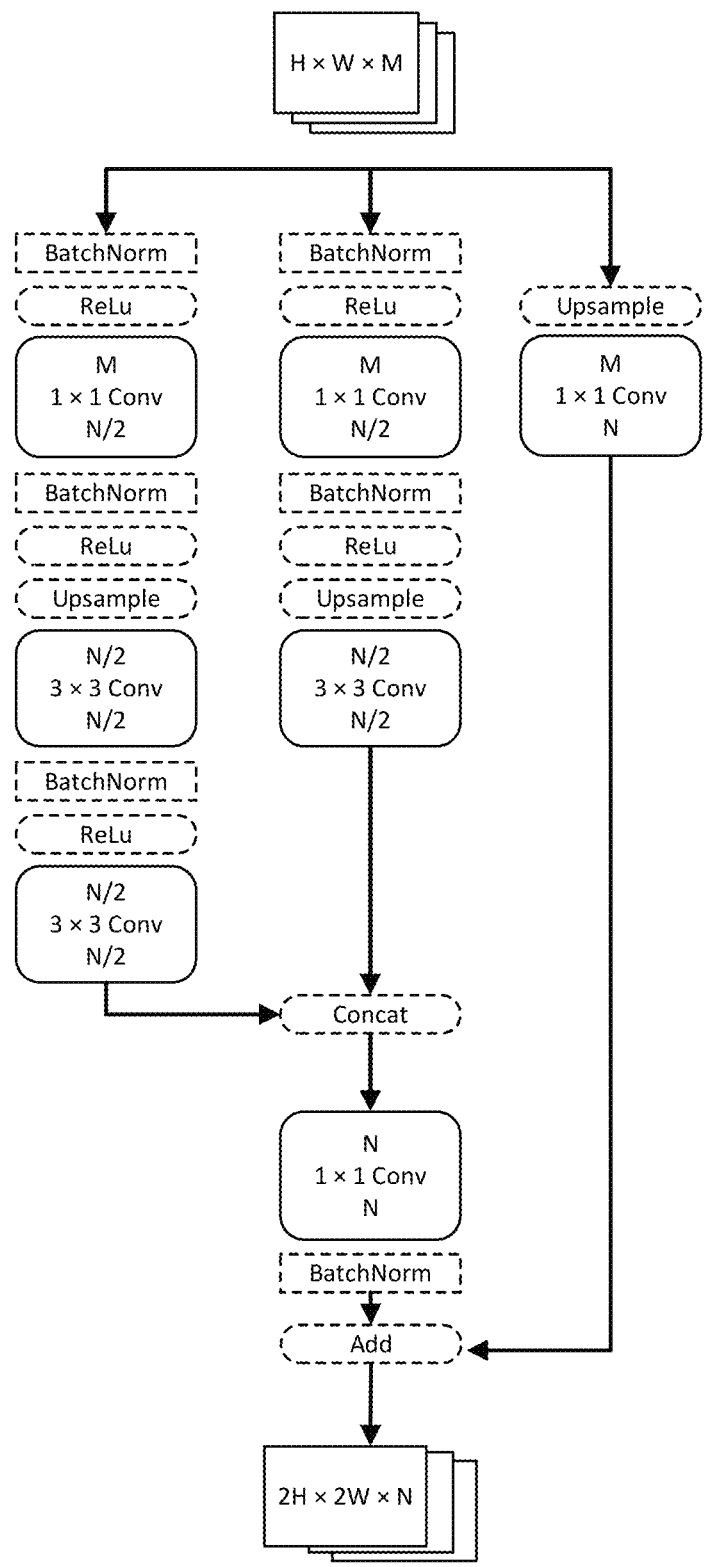
FIG. 4B schematically depicts an inception-residual block of a DANR that increases the resolution of features according to certain embodiments of the present disclosure.
Figure 4C:
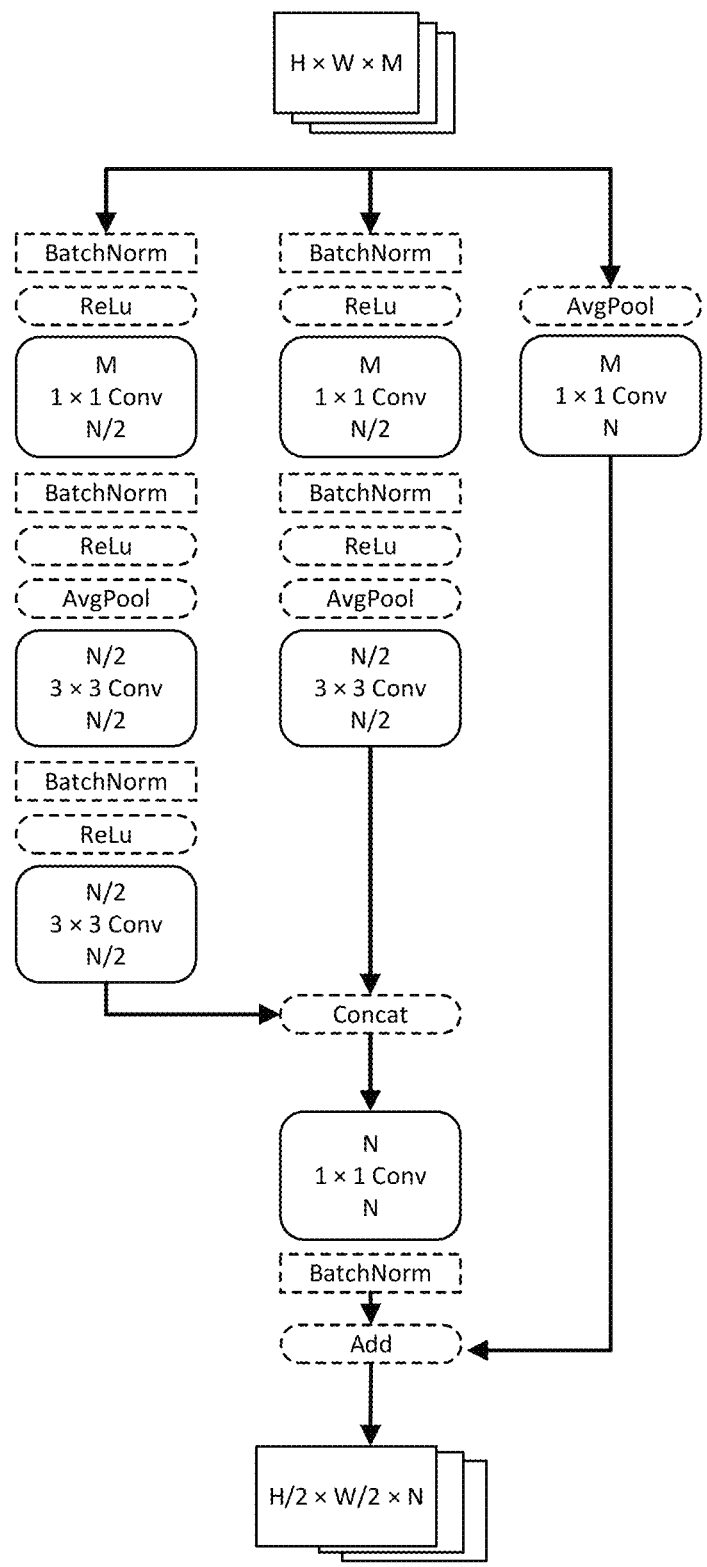
FIG. 4C schematically depicts an inception-residual block of a DANR that decreases the resolution of features according to certain embodiments of the present disclosure.
Figure 4D:
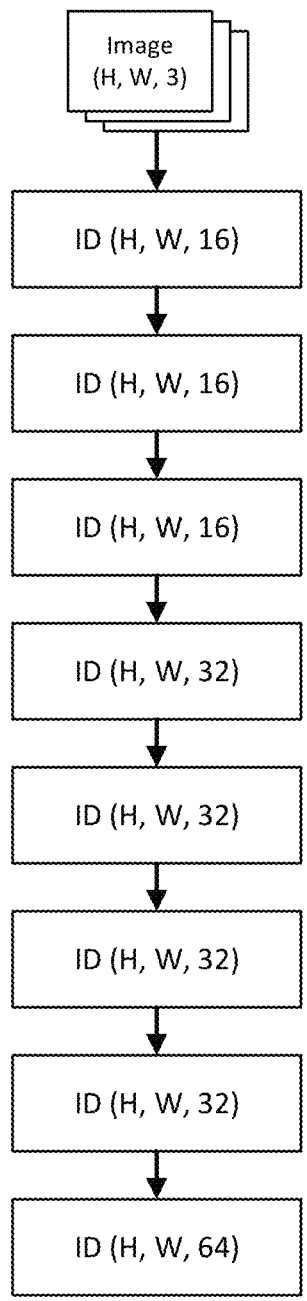
FIG. 4D schematically depicts a feature encoder stacked from inception-residual blocks according to certain embodiments of the present disclosure.
Figure 4E:
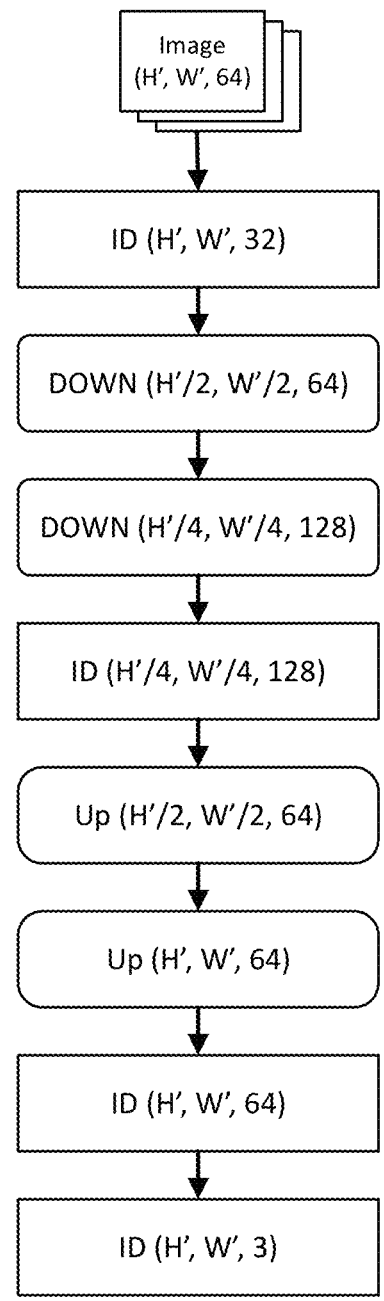
FIG. 4E schematically depicts a decoder according to certain embodiments of the present disclosure.

The feature encoder 328 is configured to, upon receiving the prepared datasets from the data preparation module 326, extract visual features from the images of the datasets, and send the visual features to the point cloud module 332. In certain embodiments, the visual features are represented by feature vectors, and each of the feature vectors corresponds to one pixel in the images. In certain embodiments, the feature vectors have multiple dimensions, for example, 10 dimensions. In certain embodiments, the feature encoder 328 includes one or more inception-residual blocks, as shown in FIG. 4D. Each inception-residual block incorporates both inception design and ResNet design, i.e., channel-wise concatenation of two branches and pixel-wise addition with an identify branch. FIG. 4A schematically depicts an inception-residual block that maintains the resolution of features, with an identity layer, FIG. 4B schematically depicts an inception-residual block that increases the resolution of features, with an upsampling layer, and FIG. 4C schematically depicts an inception-residual block that decreases the resolution of features, with an average pooling layer. FIG. 4D schematically depicts a feature encoder 328 stacked from the inception-residual block according to certain embodiments of the present disclosure, where ID means identity. The H and W in FIGS. 4A-4E are height and width of the images, i.e., the resolution of the images. The M or the number following H and W is the number of channels. There are three types of inception-residual blocks: ID, UP and DOWN, as shown in FIG. 4D and FIG. 4E. Each of the three types of blocks incorporates the inception design and residual design. The difference between the ID, UP and Down is whether the block keeps, raises, or reduces the resolution.

Figure 4F:
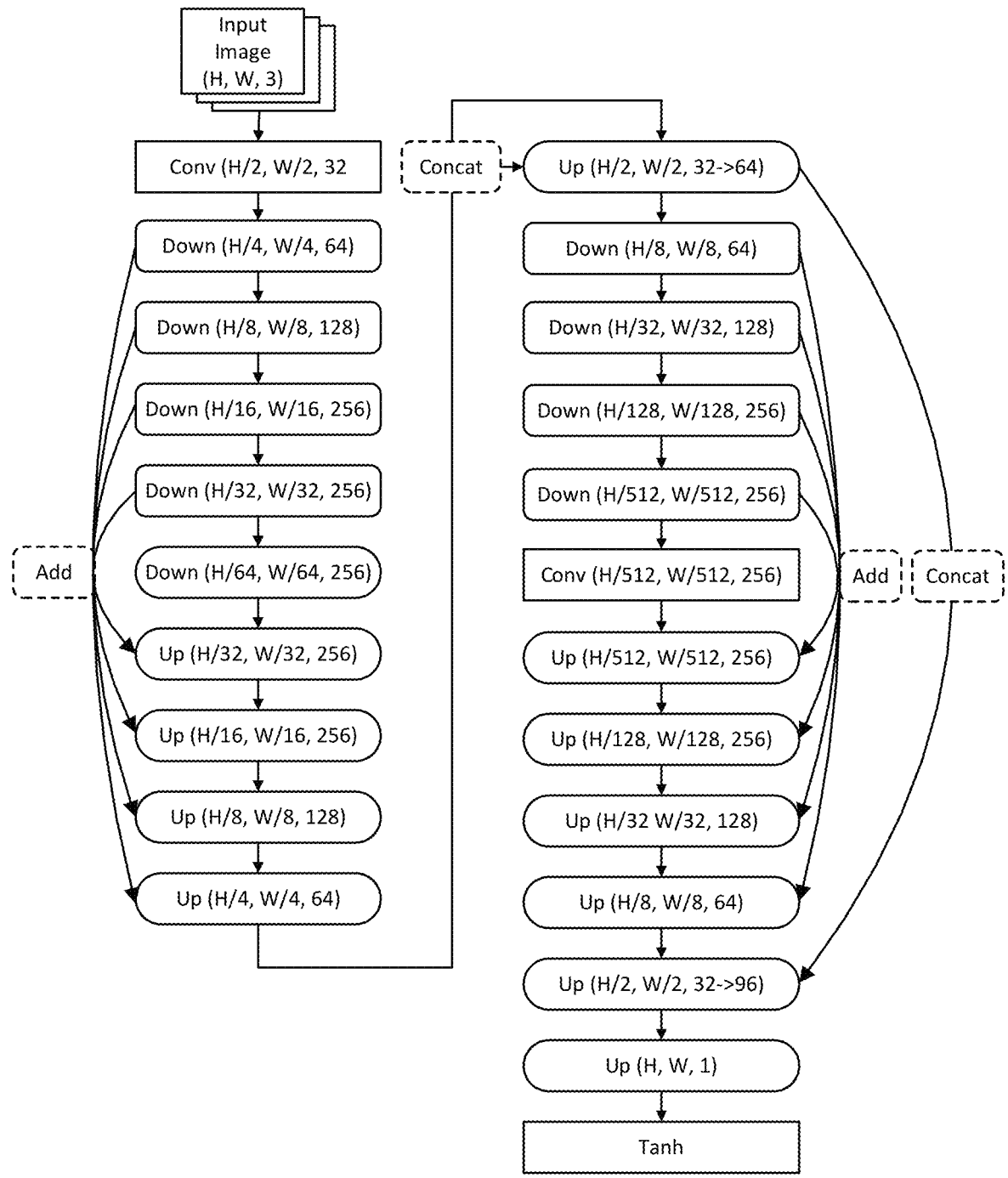
FIG. 4F schematically depicts an architecture of a depth estimator of a DANR according to certain embodiments of the present disclosure.

The depth estimator 330 is configured to, upon receiving the prepared datasets from the data preparation module 326, estimate depths for each pixel in each image of the datasets, and send the depths of the pixels to the point cloud module 332. In certain embodiments, the depth of each pixel is represented by a value d, indicating the distance from the pixel to the camera that takes the image. In certain embodiments, the value of the depth d may be normalized via a mathematic transform, e.g., $d=1/\log(d)$, in order to ease the training of the neural networks. In certain embodiments, the depth estimator 330 is an hourglass network, and this UNet-like structure is proved advantageous in terms of exploring global interdependencies across multiple scales. Estimating the depth of a pixel requires understanding of the global features as well as the local features, which is important in perceiving relative depth. In certain embodiments, the disclosure stacks two level-4 hourglass networks, with maximum channel number 256, and uses a 1×1 filter at the last convolutional layer to produce the depth map. FIG. 4F schematically depicts an architecture of the depth estimator 330 according to certain embodiments of the disclosure. Specifically, the disclosure simplifies the original hourglass network by replacing the pooling layer+ResNet blocks scheme with a down-sampling block that consists of a sequence of Leaky ReLU, convolution (stride 2 or 4, padding 1, kernel size 4), and batch normalization layers. An up-sampling block consists of a sequence of ReLU, a 2× or 4× bilinear upsampling, convolution (stride 1, padding 1, kernel size 3), and batch normalization layers. Kindly note that in FIG. 4F, the Up and Down modules raise and reduce the resolution, respectively. However, they are not inception-residual blocks. Instead, they are residual blocks with pooling and up-sampling layers. Due to the complexity of the hourglass network, it is advantageous to use the residual blocks, and the risk of running out of memory during training using the inception-residual block is avoided. The disclosure further concatenates the output feature maps of stacked hourglass sub-networks and regress depth at the last layer (no batch normalization layer).

The point cloud module 332 is configured to, upon receiving the visual features from the feature encoder 328 and the depths from the depth estimator 330, form a point cloud using the visual features and the depths of the pixels, and provide the point cloud to the splatting module 334. Specifically, for each one of the images, each pixel in the image corresponds to one point in the point cloud. Each point in the point cloud is characterized by its feature vector and its depth. In addition, the bounding box is defined in the image, and the feature of the bounding box is also defined in in the point cloud. For example, each pixel in one bounding box may be labeled as within the bounding box, and the points in the point cloud corresponding to those pixels within the bounding box are also labeled as part of the bounding box. Accordingly, each point in the point cloud is characterized by its 2.5 D location, its feature vector, and a bounding box indicator. The 2.5D location of a point includes its two-dimensional coordinates and its depth, where the two-dimensional coordinates of the point are the same as the two-dimensional coordinates of the corresponding pixel in the image. The feature vector has multiple dimensions indicating different features of the pixel in the image, such as color, edges, or even features of neighboring pixels. The feature vector is learnt from the encoder network as shown in FIG. 4D. Although the features are not readily explanatory, they should withhold information regarding the color, edges, local, and global patterns that are perceivable by human minds. In certain embodiments, the feature vector has a length of, for example, 64. The bounding box indicator shows whether the point in the point cloud is within the bounding box, which is consistent with whether the corresponding pixel in the image is within the bounding box.

Figures 5A, 5B:
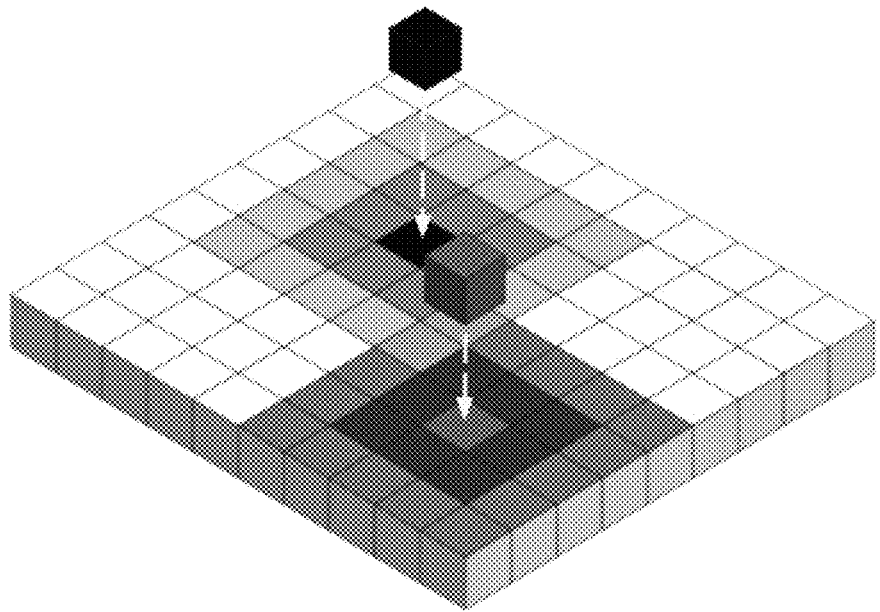
FIG. 5A schematically depicts differentiable renderer according to certain embodiments of the present disclosure.
FIG. 5B schematically depicts four camera poses for generating new images according to certain embodiments of the present disclosure.

When the data augmentation training module 320 instructs the augmentation model 324 to train the augmentation model, the splatting module 334 is configured to use the camera pose corresponding to the image in the dataset and the point cloud received from the point cloud module 332 to project the point cloud onto a predefined palette, to obtain a feature map, and send the feature map to the image decoder 336. In certain embodiments, the camera pose of the image is predefined. The camera pose includes the intrinsic and extrinsic parameters. In certain embodiments, the intrinsic parameters are provided in the training data annotation during the training of the DANR; and during the testing/inference/augmentation process, the intrinsic parameters are used as default (original pose), which is $f_x=f_y=1$, and $c_x=c_y=1$. In certain embodiments, the extrinsic parameters are not used because the disclosure only needs the rotation vector R and the translation vector T from the original pose. The disclosure only needs the difference between the original the target pose. For example, during augmentation, the disclosure uses predefined R and T. In certain embodiments, the predefined target poses or new poses include two to ten different poses. In certain embodiments, the number of predefined new poses is four, the four new poses share the same translation vector [0 0 0.3], and their respective rotation vectors are [−0.1 −0.15 0], [0.1 −0.15 0], [−0.1 0.15 0], [0.1 0.15 0]. The translation vector and rotation vector together determine the projection matrix, as shown in FIG. 5B.

The image decoder 336 is configured to, upon receiving the feature map, decode the feature map to obtain a target image, calculate a loss based on the difference between the original image from the training dataset 350 and the corresponding target image, and adjust parameters of the augmentation model 324. FIG. 4E schematically depicts a decoder structure according to certain embodiments of the present disclosure, which is stacked by inception-residual blocks. The decoder structure can be used with the encoder shown in FIG. 4D, and the decoder structure may correspond to the function of the splatting module 334 and the image decoder 336. In FIG. 4E, ID means Identity, Up is upsampling, Down is downsampling by average pooling. The resolution of input features of the Decoder (H', W') is by default identical to the features extracted by the Encoder shown in FIG. 4D. When the 3D points (2.5D points) are splatted to a larger palette, e.g. ×2 resolution, the feature map is upsampled by the scale of 2, which will uplift the image render resolution. The disclosure refers to this super-resolution method as PointSS, in contrast to PixelSS where the rendered images are fed to an external super-resolution network.

In certain embodiments, the point projection by the splatting module 334 and the image decoder 336 is performed as follows. The disclosure fixes the intrinsic parameters for all images, assuming they are taken with a default camera. Specifically, the disclosure sets focal lengths on both x and y axes to be 1 and set skew to be 0, while assuming principal point is at the origin of coordinates. Given a 2.5D point representation, the disclosure maps it to the Camera Coordinate System (CCS) of the input image:

$$\begin{cases} X_c = d \times (u - c_x)/f_x \\ Y_c = d \times (v - c_y)/f_y \\ Z_c = d \end{cases} \quad (1)$$

This CCS is now regarded as the World Coordinate System (WCS). Given a specific target view, the disclosure can determine the extrinsic parameters. Transforming from the WCS to a novel CCS is straight-forward with R and T:

$$P_c = R \cdot (P_w - T) \quad (2)$$

where $P_c =$)

The points $P_c$ are then splatted to a target camera palette with new pixel locations:

$$\begin{cases} u' = f_x \times X'_c/Z'_c + c_x \\ v' = f_y \times Y'_c/Z'_c + c_x \end{cases} \quad (3)$$

Within each bounding box i, points (at least the four points at corners) are marked with an index value i. These marked keypoints are a subset of S×S points, where S is the resolution of the extracted feature maps. When keypoints from the ith bounding box are re-projected to the target view after the procedures described above, their new pixel locations are denoted as $P'_i = \{(u'_i, v'_i)\}$. The annotation for bounding box i in the target image is computed as:

$$\begin{cases} x_{min} = \min(\{u \mid (u', v') \in P'_i\}) \\ x_{max} = \max(\{u \mid (u', v') \in P'_i\}) \\ y_{min} = \min(\{v \mid (u', v') \in P'_i\}) \\ y_{max} = \max(\{v \mid (u', v') \in P'_i\}) \end{cases} \quad (4)$$

For each pixel in the bounding box in the original image, there is a corresponding point in the point cloud, and the corresponding points can be named bounding box point. For each bounding box point, there is a corresponding projected pixel in the target image, and the corresponding projected pixels can be named bounding box pixels. The bounding box pixels in the target image can then be used to define the projected bounding box in the target image. The projected bounding box can be labeled the same way as the bounding in the original image. By this way, the projected bounding box can be determined easily and labeled directly without any object detection process. Kindly note that the projected bounding box and the bounding box in the original image may be slightly different. For example, the corner pixels in the bounding box in the original image and the corner pixels in the projected bounding box may be different, due to the pixel movement during the projection process. Further, some pixels in the bounding box in the image may also be missed in the target image due to different camera view angle.

In certain embodiments, the loss function for training the augmentation model 324 is as follows. The present disclosure follows Ning (Ning et al, Knowledge-guided deep fractal neural networks for human pose estimation, IEEE transactions on multimedia, 2018, V20(5), 1246-1259, which is incorporated herein by reference by its entirety) for the discriminator design, and use two multi-layer discriminators, the one with lower resolution serving as intermediate supervision to help the one with higher resolution learn better and faster. The overall loss is consisted of image-level L1 loss, feature-level content loss and discriminator loss. The depth map is implicitly learned where the disclosure does not enforce supervised learning.

$$\mathcal{L} = \lambda_1 \mathcal{L}_D + \lambda_2 \mathcal{L}_{L1} + \lambda_3 \mathcal{L}_C \quad (5)$$

In certain embodiments, the training of the augmentation model 324 may be performed using batches of training datasets, where each batch may include for example 10-100 images and their annotations. In certain embodiments, the training of the augmentation model 324 may be performed for a predetermined times using the same set of training dataset 350.

When the augmentation model 324 is well-trained, and the data augmentation module 322 instructs the augmentation model 324 to augment training dataset, the splatting module 334 is configured to use the predefined camera poses 360 to project one point cloud to the predefined palette to obtain multiple feature maps, and the image decoder 336 is configured to decode the multiple feature maps to multiple target images, and combine the target images with bounding box annotations and the original images with bounding box annotations to form the augmented training dataset 370. In certain embodiments, the camera poses 360 includes four different camera poses, and each original training image would result in four target images. Accordingly, the number of datasets in the final augmented training dataset 370 is five times the number of datasets in the training dataset 350.

In certain embodiments, before being splatted onto a palette, 3D cloud points in the new view are sorted in depth using a z-buffer. Naively, for all points in the new view, the nearest point in depth (by popping the z-buffer) is chosen to color that point. The disclosure follows the differentiable renderer in order to provide gradients with respect to the point cloud positions. In the differentiable renderer, K nearest points for each pixel are splatted; each of these points influences a range that originates from the splatted pixel with radius r, the influence of which is proportional to the Euclidean distance from the center. The sorted points are then accumulated using linear alpha over-compositing. In this way, the hard z-buffer becomes differentiable. In certain embodiments of the DANR, K=128, and r=4. An example of the differentiable renderer is shown in FIG. 5A. In this example, two points from the z-buffer are splatted onto a palette with an influence range of radius 3.

The object detector training module 338 is configured to, when the augmented training dataset 370 is obtained, using the augmented training dataset 370 to train the object detector 340.

The object detector 340 is configured to, when being well-trained by the object detector training module 338, process images provided by the ecommerce platform to obtain objects in the images, obtain annotation of the objects, and report the image and its annotation if the annotation meet certain criteria. In certain embodiments, the object detector 340 is configured to use a keypoint-based object detection.

Keypoint estimation is naturally a regression problem. The targets are represented by a series of heatmaps, each channel corresponding to a specific keypoint genre. Recent object detection methods such as CenterNet, CornerNet and ExtremeNet, begin to utilize keypoint estimation techniques. For instance, CenterNet transforms the task of object detection from generating and classifying proposals into predicting objects centers (keypoints) and corresponding attributes. For object detection, the attributes are the width, height of the object, along with local offsets that recover pixel location in the original resolution from down-sampled heatmaps. The disclosure uses CenterNet as baseline detection framework to conduct experiments and ablation studies, due to its simplicity. Because it is anchor-free and does not need non-maximum suppression (NMS) as a post-processing step, the ablation study can be decoupled from complex design choices that is not concerned with training data. Anchor-free. During training, an object does not need to be assigned with proper anchor(s). Instead, only heatmaps for the entire image are generated as the regression target. NMS-free. When the heatmaps for object centers are inferred, the local peaks are ranked based on their response, and only top K objects are extracted. With the center positions, corresponding attributes are extracted across their respective channels at the same 2D position. Since keypoints of different genres can occur at the same position, CenterNet is also naturally compatible with multilabel problems.

In certain embodiments, keypoint-based mixed up is used for object detection by the object detector 340. It is first demonstrated in Inoue (Inoue, Data augmentation by paring samples for images classification, arXiv:1801.02929, 2018) how mixing samples up could be developed into an effective augmentation strategy. Image mixup for the task of object detection has been described in Zhang (Zhang et al., Bag of freebies for training object device detection neural networks, arXiv:1902.04103, 2019), but it is restricted to bounding box mixup. In certain embodiments, the present disclosure designs a straight-forward image mixup strategy for keypoint-based object detection methods, where ground truth keypoints are splat onto a heatmap $$Y \in [0, 1]^{\frac{W}{R} \times \frac{H}{R} \times C}$$

using a Gaussian kernel:

$$Y_{xyc} = \exp\left(\frac{(x - \tilde{p}_x)^2 + (y - \tilde{p}_y)^2}{2\sigma_p^2}\right) \quad (6)$$

$\sigma_p$ is an adaptive standard deviation that is proportional to the size of the object. During mixup, the confidence of keypoint heatmaps are applied with the same weights used on its corresponding image. This mixup strategy can be applied to keypoint-based object detection methods such as CenterNet. Compatible with the offline augmentation method of the present disclosure, image mixup is used in all of our experiments as an online augmentation method.

The user interface 342 is configured to provide a user interface or graphic user interface in the computing device 310. In certain embodiments, the user or the administrator of the system is able to configure parameters for the modules in the object detection application 318.

The training dataset 350 includes dataset for training the augmentation model 324 or for being used by the augmentation model 324 to generate the augmented training dataset 370. The training dataset 350 includes images and labels of the images. The label for each image may include a bounding box enclosing an object in the image, and a category of the object. In certain embodiments, the training dataset 350 may also include the camera poses for taking the images.

The camera poses 360 includes definition of camera poses used by the augmentation model 324 to generate augmented training database 370. In certain embodiments, the camera poses are relative poses in regard to the original camera pose of the image, and each camera pose defined by the camera poses 360 is used to generate one augmented image. In certain embodiments, the camera poses 360 are defined such that they are distant from each other. The distribution of the camera poses at different view angles improves quality of the augmented training dataset 370. In certain embodiments, the number of camera poses 360 is in a range of 2-10. In certain embodiments, the number of camera poses 360 is four. FIG. 5B schematically depicts four camera poses 360. As shown in FIG. 5B, the camera poses 360 are defined by rotation and translation relative to the original camera pose. In certain embodiments, the original camera poses can be derived based on intrinsic and extrinsic parameters of cameras of training images.

The augmented training dataset 370 are generated by the augmentation model 324 based on the training dataset 350 and the camera poses 360. In certain embodiments, for each training image from the training dataset 350, the augmentation model 324 generate the number of new images corresponding to the number of camera poses 360, and then combine the original training images and the new images, together with the annotations, to form the augmented training dataset 370.

Kindly note the modules in the object detection application 318 may process each of the images one by one, or process the images by batches, and the images in each batch may be processed in parallel.

Figure 6:
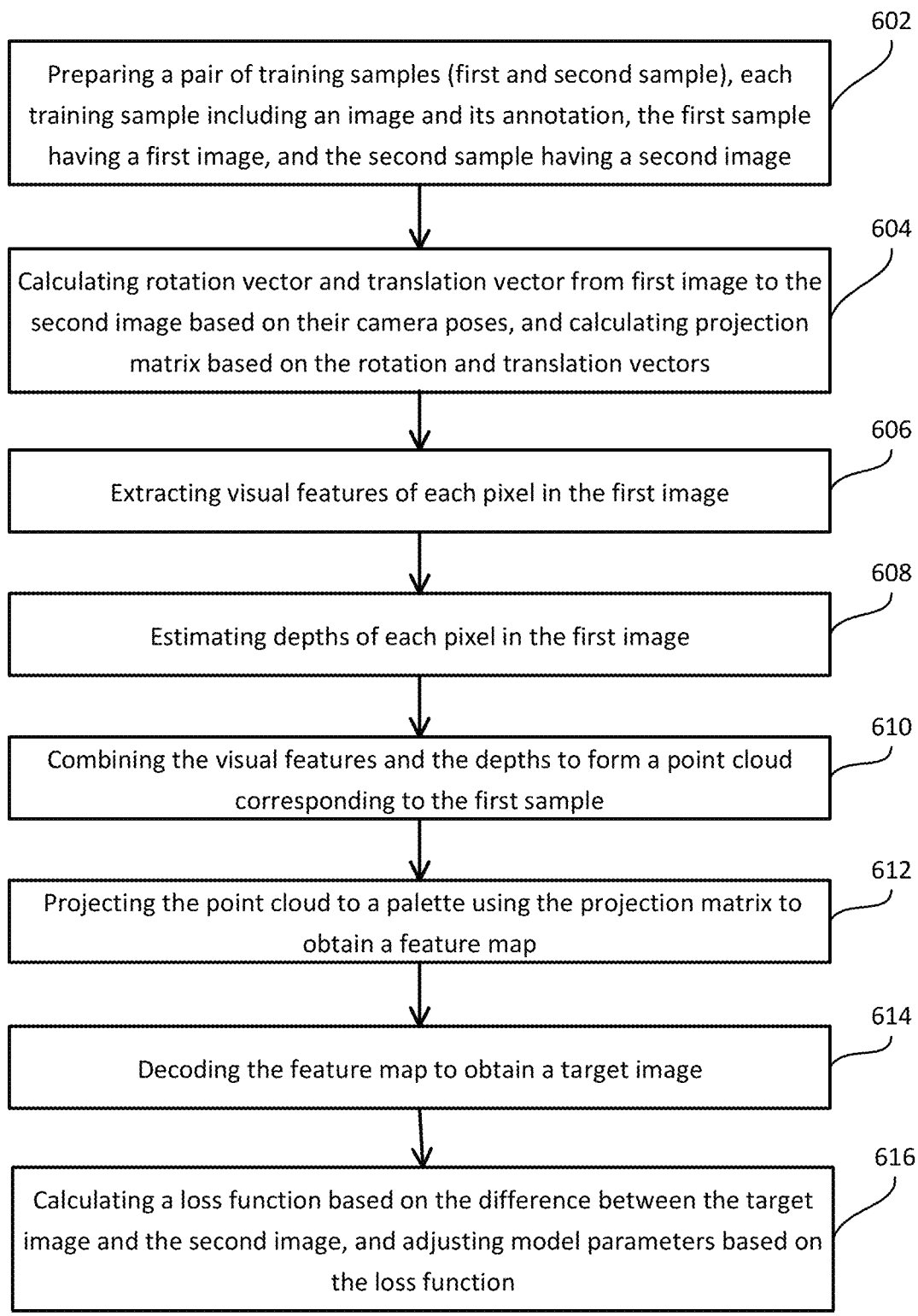
FIG. 6 schematically depict a process for training an augmentation model according to certain embodiments of the present disclosure.

FIG. 6 schematically depict a process 600 for training the augmentation model according to certain embodiments of the present disclosure. In certain embodiments, the training process is performed by a computing device, such as the computing device 310 shown in FIG. 3, and specifically by the augmentation model 324. It should be particularly noted that, unless otherwise stated in the present disclosure, the steps of the training process may be arranged in a different sequential order, and are thus not limited to the sequential order as shown in FIG. 6.

As shown in FIG. 6, at procedure 602, the date augmentation training module 320 calls the training of the augmentation model 324. At initialization of the called training, the data preparation module 326 prepares the training dataset 350, and sends the prepared training dataset to the feature encoder 328 and the depth estimator 330. The prepared training dataset 350 includes multiple training samples, each training sample includes an image and its annotation. The annotation includes a definition of a bounding box enclosing an object in the image, and the identification of the object. In certain embodiments, the definition of the bounding box may include the center, the width and the length of the bounding box. In certain embodiments, the definition of bounding box may be a labeled character of the pixels of the images, where the labeled character may be inside or outside the bounding box. The identification of the object may be the category of the object or the name of the object. In certain embodiments, the training dataset 350 is prepared in advance manually. In certain embodiments, the training dataset 350 is further expanded automatically by incorporating new images and their labels filtered out in an ecommerce platform. In certain embodiments, the training of the augmentation model 324 is performed using batches of training dataset. In certain embodiments, each batch of training dataset includes 5-50 different training samples. In certain embodiments, the number of training samples in each batch is eight. In certain embodiments, the training samples are arranged by pairs, and the disclosure takes a pair of adjacent frames (images) for each back-propagation. In each pair, the adjacent images has a distance/interval ranging from 0.5 second to 1 second, and the two images are of the same scene but in slightly different angles. The two images in the pair is named first image I and second image I'. For the first image I and the second image I', the ground truth contains their corresponding camera poses.

At procedure 604, for the pair of samples, the disclosure calculates rotation vector R and translation vector T from the first image I to the second image I' based on their camera poses, and calculates projection matrix P based on the rotation vector R and translation vector T.

At procedure 606, upon receiving the prepared training datasets, the feature encoder 328 extract visual features from the first image I, and sends the visual features to the point cloud module 332. In certain embodiments, each pixel in the first image I is represented by a visual vector. In certain embodiments, each visual vector has, for example, 100 dimensions. In certain embodiments, one of the dimensions or an additional feature for each pixel exits, and the dimension or the additional feature indicates whether it is inside or outside the bounding box.

At procedure 608, upon receiving the prepared datasets, the depth estimator 330 estimates depths for each pixel in the first image I, and sends the depths of the pixels to the point cloud module 332.

At procedure 610, upon receiving the visual features and the estimated depths, the point cloud module 332 combines the information for the first image I to form a point cloud for that image, and sends the point cloud to the splatting module 334. The point cloud includes points, each point corresponds to a pixel in the original image I. Each point has a two-dimensional coordinates (u, v) and a depth d, has a label indicating whether the point is within the bounding box or not, and has the visual vector corresponding to the feature of the pixel, where the feature includes color, edges, etc.

At procedure 612, upon receiving the point cloud, the splatting module 334 uses the projection matrix P, projects the points of the point cloud to a predefined palette to obtain a feature map, and sends the feature map to the image decoder 336. The points having the character of within the bounding box or outside the bounding box is also transferred to the feature map. In certain embodiments, the disclosure chooses the first image I as the input image, and projects the points of its point cloud using the projection matrix P to obtain the corresponding feature map.

At procedure 614, upon receiving the feature map corresponding to the first image I, the image decoder 336 decodes the feature map to form a target image I". The target image I" includes definition of the target bounding box. In certain embodiments, each pixel in the target image has a character of within the bounding box or outside the bounding box, which is transferred from the feature map.

At procedure 616, the image decoder 336 further compares the target image I" with the second image I' to calculate a loss, and adjusts parameters of the augmentation model 324 based on the loss by back-propagation. In certain embodiments, the disclosure may also project the firs image based on its own camera pose (using projection matrix [0 0 0]) to obtain a target image, calculate the loss by comparing the target image with the first image, and back-propagate based on the loss.

With the adjusted parameters, the training process may be performed again using another pair of training samples from the training dataset, until the parameters converge, or until a predetermined times of training iterations are completed, or until the training is performed using a predefined number of images.

In certain embodiments, for each iteration, the disclosure uses a batch of multiple pair of images. Using batch of pairs instead of one pair speeds up the training process, and averages the errors. For example, each batch may include eight pairs of images, the eight pairs of images can be processed by, for example a graphic processing unit (GPU) in parallel, the forward propagation in the batch can be averaged; then at the end of the procession of the batch, parameters are adjusted and back propagation is performed. After the iteration using one batch, the disclosure then retrieves another batch to perform another iteration of the training. In certain embodiments, the training dataset includes continuous video frames (images), and each of the pair of images may be selected from the videos. The selection of one pair of images may be performed by: selecting a frame (image) i from a randomly picked video, and searching a frame in the N number of frames following the frame i, where N is a positive integer, such as 15. The searching may be performed by: selecting a frame from the 15 frames, calculating the rotation and translation matrix of the selected frame relative to the frame i, and the selected frame is determined to form the pair with the frame i when the rotation between the frames is greater than 5 degrees and the translation between the frames is greater than 0.15. The selection of the frame may be performed one by one from the first of the 15 frames to the last of the 15 frames until a frame meeting the above criteria is found. In certain embodiments, the disclosure may also calculate the rotation and translation matrix for the 15 frames in parallel, and randomly selecting one of the frames that meets the above criteria.

When the augmentation model 324 is well-trained, the well-trained model 324 can be used to augment the training dataset 350 to generate augmented training dataset 370. In certain embodiments, the training dataset used for training the augmentation model 324 and the training dataset used for generating the augmented training dataset 370 may be different datasets, or may be the same datasets. In certain embodiments, a portion of the training dataset 350 is used to train the augmentation model 324, and the rest of the training dataset 350 is used for generating the augmented training dataset 370.

Figure 7:
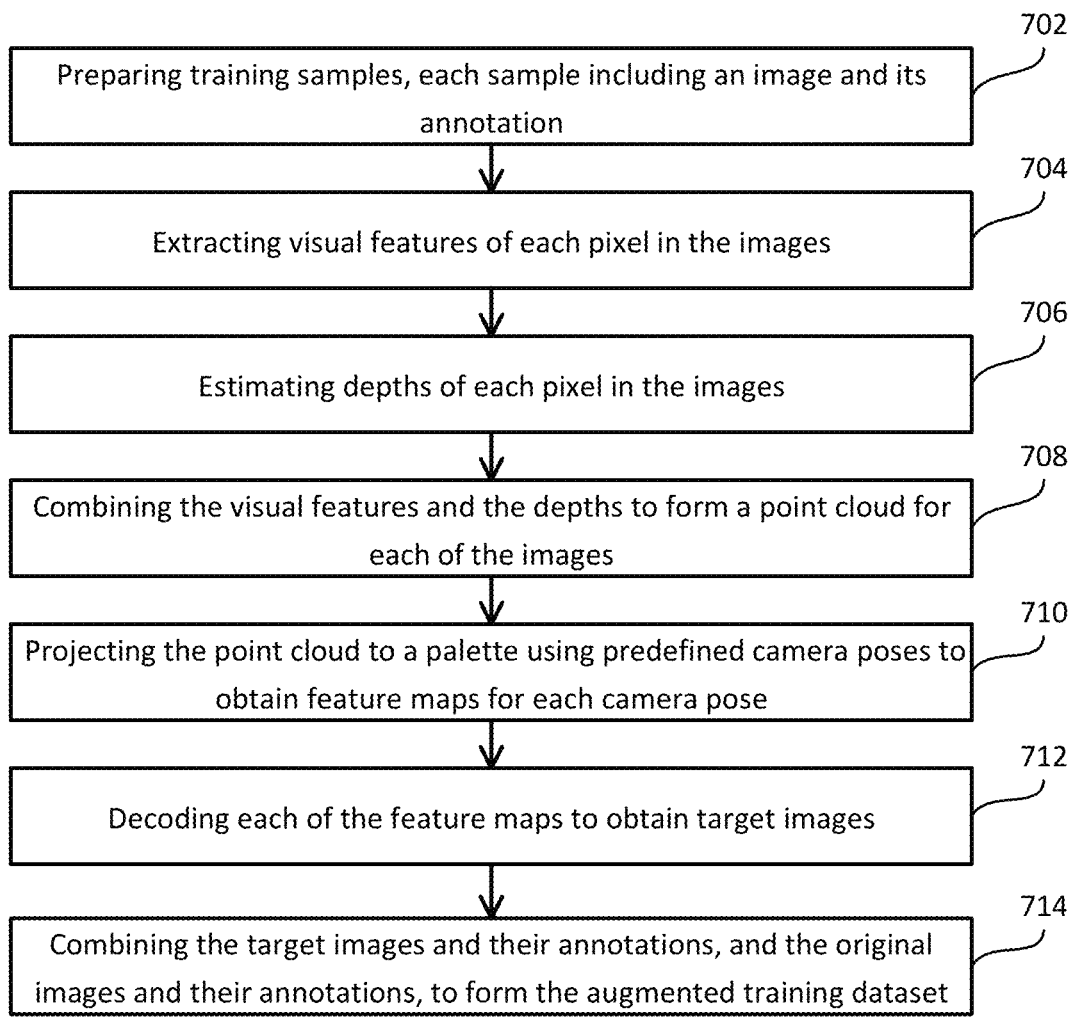
FIG. 7 schematically depict a process for augmenting training dataset according to certain embodiments of the present disclosure.

FIG. 7 schematically depict a process 700 for augmenting training dataset according to certain embodiments of the present disclosure. In certain embodiments, the augmentation process is performed by a computing device, such as the computing device 310 shown in FIG. 3, and specifically by the augmentation model 324. It should be particularly noted that, unless otherwise stated in the present disclosure, the steps of the training process may be arranged in a different sequential order, and are thus not limited to the sequential order as shown in FIG. 7.

As shown in FIG. 7, at procedure 702, the date augmentation module 322 calls the augmentation model 324 to augment training dataset. At first, the data preparation module 326 prepares the training dataset 350, and sends the prepared training dataset to the feature encoder 328 and the depth estimator 330. The prepared training dataset 350 includes multiple datasets, each dataset includes an image and its annotation. The annotation includes a definition of a bounding box enclosing an object in the image, and the identification of the object.

At procedure 704, upon receiving the prepared training datasets, the feature encoder 328 extract visual features from the images of the datasets, and sends the visual features to the point cloud module 332. In certain embodiments, each pixel in one of the images is represented by a visual vector. In certain embodiments, each visual vector has, for example, 100 dimensions. In certain embodiments, one of the dimensions or an additional feature for each pixel corresponds to the bounding box, where each pixel is indicated a pixel inside the bounding box or a pixel outside the bounding box.

At procedure 706, upon receiving the prepared datasets, the depth estimator 330 estimates depths for each pixel in each of the images, and sends the depths of the pixels to the point cloud module 332.

At procedure 708, upon receiving the visual features and the estimated depths from one of the images, the point cloud module 332 combines the information for each image to form a point cloud for that image, and sends the point cloud to the splatting module 334.

As shown above, the procedures 704-708 are substantially the same as the procedures 606-610, except that the augmentation model 324 has been well trained at this time, and the prepared datasets may include more data.

At procedure 710, upon receiving the point cloud, the splatting module 334 retrieves the camera poses 360 (specifically the projection matrix), projects the points of the point cloud to a predefined palette using the projection matrix to obtain feature maps, and sends the feature maps to the image decoder 336. Each feature map corresponds to one of the camera poses 360. If there are four new poses, then there would be four generated feature maps for each of the images.

At procedure 712, upon receiving the feature maps, the image decoder 336 decodes the feature maps to form target images. Each target image corresponds to one of the feature maps. The target image includes definition of the target bounding box.

At procedure 714, the image decoder 336 further combines the target images, the annotations of the target images, and the corresponding original image and its annotation, to form the augmented training dataset 370. For example, if there are four new camera poses provided, the model would generate four new target images. Accordingly, for each original image, there would be five images with their annotations, which correspond to the one original image and the four new images.

Figure 8:
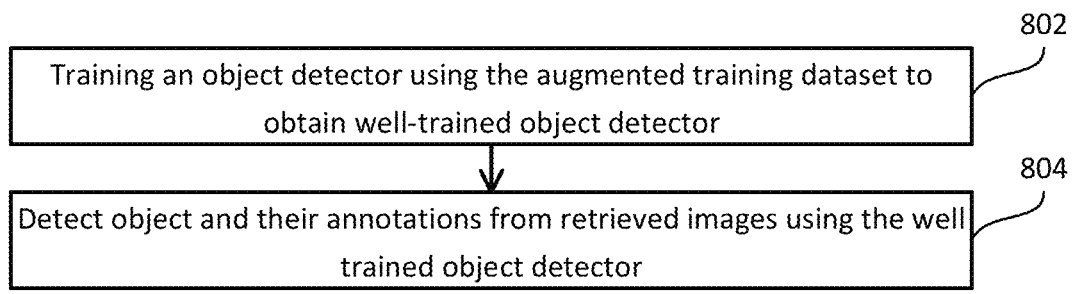
FIG. 8 schematically depict a process for training an object detector using the augmented training dataset according to certain embodiments of the present disclosure.

FIG. 8 schematically depict a process 800 for training an object detector using the augmented training dataset according to certain embodiments of the present disclosure. In certain embodiments, the training process is performed by a computing device, such as the computing device 310 shown in FIG. 3, and specifically by the object detector training module 338. It should be particularly noted that, unless otherwise stated in the present disclosure, the steps of the training process may be arranged in a different sequential order, and are thus not limited to the sequential order as shown in FIG. 8.

As shown in FIG. 8, when the augmented training dataset 370 is available, at procedure 802, the object detector training module 338 trains the object detector 340 using the augmented training dataset 370. The training may be performed iteratively until parameters of the object detector 340 converge.

At procedure 804, after well-training of the object detector 340, the object detection application 318 retrieves images for detection, use the object detector 340 to detect objects from the retrieved images. The detection result may include one or more bounding boxes in the retrieved images, each bounding box encloses an object in one of the retrieved images, and the object is labeled with an identification, such as the category or the name of the object. In certain embodiments, the images are automatically retrieved by the object detector 340 from the ecommerce platform, such as new product images, or images from new forum posts.

At procedure 806, the object detector 340 further provides a warning message when certain categories or names are detected from the retrieved images, and sends the warning message to an intended administrator or user.

In certain embodiments, the object detector 340 has a CenterNet structure. During object detection, an RGB image is inputted and the output includes multiple heatmaps or channels, each heatmap corresponds to an object, such as weapons, cigarette, or flag. When the value of the pixels in one heatmap is greater than a threshold value such as 0.5, it is determined that the image has the object corresponding to the heatmap.

In certain aspects, the present disclosure relates to a non-transitory computer readable medium storing computer executable code. In certain embodiments, the computer executable code may be the software stored in the storage device 316 as described above. The computer executable code, when being executed, may perform the methods described above.

In certain aspects, with DANR, the detection performance is significantly improved. However, we notice that the average precision for small objects suffer a performance drop. We hypothesize that it is due to the small render resolution (e.g. 256×256) compared to the detector input resolution (e.g., 512×512). In order to generate images at higher resolution, we experiment with 3 different settings: (1) Without any further training, we apply the network trained on a smaller image size to a different size at test time. Specifically, we splat the $256^2$ cloud points onto 512×512 palette maps, then render the maps to an image with a refinement network. This augment method increased image resolution by super-sampling of splatted points, and is denoted as 512-pointSS. (2) We first augment images at 256×256, and further upsample pixels at the image level with a pre-trained super-sampling network. We denote this method as 512-pixelSS. (3) We re-train a network from scratch that takes in images at 512×512, generate feature maps at 512×512, and sample $512^2$ feature points in the cloud. These points are splatted and rendered on the output image. This method naturally outputs images in 512×512 resolution, therefore denoted as 512-native. FIG. 9A compares performance of the DANR using high render resolution and low render resolution, where the dataset is an indoor validation set, AP means average precision, N.A. means online augmentation data using a keypoint-based image mixup strategy, APs indicates AP for small image size, $AP_M$ indicates AP for medium image size, and APL indicates AP for large image size. As show in FIG. 9A, (1) augmentation with images rendered at different resolutions consistently boosts the detection performance; (2) synthesized images at low resolutions may potentially lose some details compared to real images, which does harm to the detection performance of very small objects; (3) uplifting the image resolution via super-sampling further improves the performance; (4) super-sampling from points may be a better choice than super-sampling from pixels; (5) training a network with dense features and points achieves the best performance. In the following experiments, we use 512-native as our resolution setting, as it achieves the highest AP and does not need any additional super-sampling networks.

In certain aspects, the performance of DANR on datasets with different data scarcity is evaluation. The experiment is performed with three data-split settings: 5:5, 3:7 and 1:9. Highest degree of scarcity is 1:9. Each image is augmented with four synthesized images. While splitting images to train and validation sets, an image is assigned along with its corresponding augmented images. FIG. 9B compares performance of the DANR using different training: validation data splitting ratios, where the dataset is an indoor validation set. As shown in FIG. 9B, the performance boost is closely related with the scarcity of training data. When annotated data is very limited, the DANR approach becomes more beneficial.

In certain embodiments, backbone for DANR is optimized. We fix the detector to CenterNet while comparing different backbones. FIG. 9C compares performance of the DANR using different backbones including ResNet-50 and ResNeSt-50, where the dataset is an indoor validation set. As shown in FIG. 9C, the proposed augmentation consistently boost the detection performance, regardless of the backbones used by the detector.

In certain embodiments, application of DANR on one-stage and two-stage detection frameworks are evaluated. We use CenterNet as an example of one-stage method, while using Hit-Detector to represent the two-stage approach. We use the official code release of Hit-Detector to perform training and testing. Not surprisingly, as shown in FIG. 9D, DANR does not rely on the one-stage detection framework. It is beneficial to two-stage detectors as well.

In certain aspects, experimental results on various datasets are shown in FIG. 9E. As shown in FIG. 9E: (1) Results on image content review datasets (ICR-Weapon, ICR-Flag and ICR-Logo) show that the DANR is consistently helpful on real-world data when training data is scarce; (2) Results on indoor dataset show that the augmentation is highly beneficial with indoor data, even when training data is not scarce; (3) Results on COCO dataset have shown that DANR makes little contribution under circumstances where (a) the neural renderer in DANR fails to fully generalize to the semantics of the particular dataset, and (b) the training data is abundant.

In summary, certain embodiments of the present disclosure provides a new method of data augmentation for object detection based on differentiable neural rendering. Compared with existing methods, neural rendering offers a more promising generative modeling technique for use in data augmentation, as it bridges the 2D and 3D domain, and offers highly controllable ways to manipulate images. During rendering, the bounding box definition and labeling are maintained or projected, such that the rendered new images also include bounding box information. As the result, the rendered new images and the bounding box information for the new images can be used directly as training dataset for object detection. Extensive experimental results show that the DANR method of the disclosure significantly improves the detection performance when annotated data is scarce, and is a very promising counterpart in dealing with long-tailed problems, along with other machine learning paradigms such as semi-supervised learning. Further, the augmentation based on neural rendering can be effectively applied to other cognitive vision tasks.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system comprising a computing device, the computing device comprising a processor and a storage device storing computer executable code, wherein the computer executable code, when executed at the processor, is configured to:
provide a two-dimensional (2D) image and a projection camera pose, wherein the 2D image comprises a bounding box, the bounding box encloses an object, and the bounding box is annotated according to the object;
extract feature vectors of pixels in the 2D image, each pixel having a corresponding feature vector;
estimate depths of the pixels from the 2D image;
generate a point cloud using the feature vectors and the depths of the pixels; and
project the point cloud to obtain a projected image using the projection camera pose,
wherein each of the pixels within the bounding box has a bounding box label and is named bounding box pixel, each point in the point cloud corresponding to the bounding box pixel has the bounding box label and is named bounding box point, each image pixel in the projected image corresponding to the bounding box point has the bounding box label and is named projected bounding box pixel, and a projected bounding box is defined using the projected bounding box pixels.

2. The system of claim 1, wherein the computer executable code is configured to extract the feature points using an encoder with Inception-ResNet blocks.

3. The system of claim 1, wherein the computer executable code is configured to estimate the depths using an hourglass network.

4. The system of claim 1, wherein when the projected camara pose is an original pose of a camera taking the 2D image, the computer executable code is configured to project the point cloud using:

$$\begin{cases} X_c = d \times (u - c_x)/f_x \\ Y_c = d \times (v - c_y)/f_y \\ Z_c = d \end{cases} \quad (1)$$

wherein (u, v) is coordinate of a target point in the point cloud, d is depth of the target point in the point cloud, $c_x$ and $c_y$ are bias of a center of the camera, $f_x$ and $f_y$ are focal lengths on x and y axes of the camera, and $(X_c, Y_c, Z_c)$ are coordinates of the target point in the camera coordinate system.

5. The system of claim 4, wherein the computer executable code is configured to compare the projected image with the 2D image to learn parameters for extracting the feature keypoints, estimating the depths, generating the point cloud, and projecting the point cloud.

6. The system of claim 4, wherein when the projected camera pose is a new pose having a rotation R and a translation T relative to the original camera pose, the computer executable code is configured to project the point cloud using:

$$P_c = R \cdot (P_w - T), \text{ and} \qquad (2)$$

$$\begin{cases} u' = f_x \times X'_c/Z'_c + c_x \\ v' = f_y \times Y'_c/Z'_c + c_x \end{cases}, \qquad (3)$$

wherein $P_w$ is equivalent to the equation (1), $P_c$ is coordinates of the target point in a novel camera coordinate system corresponding to the new pose and $P_c$ is represented by $(X'_c, Y'_c, Z'_c)$, and (u', v') are coordinates of a pixel in the projected image corresponding to the target point.

7. The system of claim 6, wherein the projected bounding box is defined by:

$$\begin{cases} x_{min} = \min(\{u \mid (u', v') \in P'_i\}) \\ x_{max} = \max(\{u \mid (u', v') \in P'_i\}) \\ y_{min} = \min(\{v \mid (u', v') \in P'_i\}) \\ y_{max} = \max(\{v \mid (u', v') \in P'_i\}) \end{cases}, \qquad (4)$$

wherein $P'_i = \{(u'_i, v'_i)\}$ are coordinates of pixels in the projected bounding box.

8. The system of claim 1, wherein the computer executable code is further configured to:
combine the 2D image and the bounding box, and the projected image and projected bounding box, to form a training dataset;
use the training dataset to train a neural network for object detection;
use the neural network to detect objects in retrieved images from an ecommerce platform; and
send a warning message for one of the retrieved images when a detected object from the one of the retrieved images belongs to a predefined object type.

9. The system of claim 1, wherein the projected camera pose comprises four different poses different from original camera pose for taking the 2D image.

10. The system of claim 1, wherein a number of the projected pose is four, and the four projected poses are substantially evenly distributed in three-dimensional space relative to the original camera pose.

11. A method, comprising:
providing, by a computing device, a two-dimensional (2D) image and a projection camera pose, wherein the 2D image comprises a bounding box, the bounding box encloses an object, and the bounding box is annotated according to the object;
extracting, by the computing device, feature vectors of pixels in the 2D image, each pixel having a corresponding feature vector;
estimating, by the computing device, depths of the pixels from the 2D image;
generating, by the computing device, a point cloud using the feature vectors and the depths of the pixels; and
projecting, by the computing device, the point cloud to obtain a projected image using the projection camera pose,
wherein each of the pixels within the bounding box has a bounding box label and is named bounding box pixel, each point in the point cloud corresponding to the bounding box pixel has the bounding box label and is named bounding box point, each pixel in the projected image corresponding to the bounding box point has the bounding box label and is named projected bounding box pixel, and a projected bounding box is defined using the projected bounding box pixels.

12. The method of claim 11, wherein the step of extracting the feature vectors is performed using an encoder with Inception-ResNet blocks.

13. The method of claim 11, wherein the step of estimating the depths is performed using an hourglass network.

14. The method of claim 11, wherein when the projected camera pose is an original pose of a camera taking the 2D image, the step of projecting the point cloud is performed using:

$$\begin{cases} X_c = d \times (u - c_x)/f_x \\ Y_c = d \times (v - c_y)/f_y \\ Z_c = d \end{cases}, \qquad (1)$$

wherein (u, v) is coordinate of a target point in the point cloud, d is depth of the point in the point cloud, $c_x$ and $c_y$ are bias of a center of the camera, $f_x$ and $f_y$ are focal lengths on x and y axes of the camera, and $(X_c, Y_c, Z_c)$ are coordinates of the target point in the camera coordinate system.

15. The method of claim 14, further comprising comparing the projected image with the 2D image to learn parameters for extracting the feature vectors, estimating the depths, generating the point cloud, and projecting the point cloud.

16. The method of claim 14, wherein when the projected camera pose is a new pose having a rotation R and a translation T relative to the original camera pose, the step of projecting the point cloud is performed using:

$$P_c = R \cdot (P_w - T), \text{ and} \qquad (2)$$

$$\begin{cases} u' = f_x \times X'_c/Z'_c + c_x \\ v' = f_y \times Y'_c/Z'_c + c_x \end{cases}, \qquad (3)$$

wherein $P_w$ is equivalent to the equation (1), $P_c$ is coordinates of the target point in a novel camera coordinate system corresponding to the new pose and $P_c$ is represented by $(X'_c, Y'_c, Z'_c)$, and (u', v') are coordinates of a pixel in the projected image corresponding to the target point.

17. The method of claim 16, wherein the projected bounding box is defined by:

$$\begin{cases} x_{min} = \min(\{u \mid (u', v') \in P'_i\}) \\ x_{max} = \max(\{u \mid (u', v') \in P'_i\}) \\ y_{min} = \min(\{v \mid (u', v') \in P'_i\}) \\ y_{max} = \max(\{v \mid (u', v') \in P'_i\}) \end{cases}, \qquad (4)$$

wherein $P'_i = \{(v'_i, v'_i)\}$ are coordinates of pixels in the projected bounding box.

18. The method of claim 11, further comprising:
combining the 2D image and the bounding box, and the projected image and projected bounding box, to form a training dataset;
using the training dataset to train a neural network for object detection;
using the neural network to detect objects in retrieved images from an ecommerce platform; and
sending a warning message for one of the retrieved images when a detected object from the one of the retrieved images belongs to a predefined object type.

19. The method of claim 11, wherein the projected camera pose comprises four different poses different from original camera pose for taking the 2D image.

20. A non-transitory computer readable medium storing computer executable code, wherein the computer executable code, when executed at a processor of a computing device, is configured to:
provide a two-dimensional (2D) image and a projection camera pose, wherein the 2D image comprises a bounding box, the bounding box encloses an object, and the bounding box is annotated according to the object;
extract feature vectors of pixels in the 2D image, each pixel having a corresponding feature vector;
estimate depths of the pixels from the 2D image;
generate a point cloud using the feature vectors and the depths of the pixels; and
project the point cloud to obtain a projected image using the projection camera pose,
wherein each of the pixels within the bounding box has a bounding box label and is named bounding box pixel, each point in the point cloud corresponding to the bounding box pixel has the bounding box label and is named bounding box point, each image pixel in the projected image corresponding to the bounding box point has the bounding box label and is named projected bounding box pixel, and a projected bounding box is defined using the projected bounding box pixels.

\* \* \* \* \*